(12) United States Patent
Mizushima

(10) Patent No.: US 6,862,541 B2
(45) Date of Patent: Mar. 1, 2005

(54) METHOD AND APPARATUS FOR CONCURRENTLY ESTIMATING RESPECTIVE DIRECTIONS OF A PLURALITY OF SOUND SOURCES AND FOR MONITORING INDIVIDUAL SOUND LEVELS OF RESPECTIVE MOVING SOUND SOURCES

(75) Inventor: Koichiro Mizushima, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 382 days.

(21) Appl. No.: 09/734,716

(22) Filed: Dec. 13, 2000

(65) Prior Publication Data

US 2001/0007969 A1 Jul. 12, 2001

(30) Foreign Application Priority Data

Dec. 14, 1999 (JP) .......................................... 11-354182

(51) Int. Cl.[7] .............................................. G01R 23/16
(52) U.S. Cl. ......................................................... 702/76
(58) Field of Search .............................. 702/48, 54, 76, 702/145, 146, 151, 159, 171; 340/935, 943; 367/118, 129; 342/147, 157, 417

(56) References Cited

U.S. PATENT DOCUMENTS

| | | | |
|---|---|---|---|
| 4,208,735 A | 6/1980 | Suzuki et al. | |
| 4,893,289 A | 1/1990 | Greenwood et al. | |
| 5,189,425 A | 2/1993 | Dabbs | 342/52 |
| 5,539,859 A | 7/1996 | Robbe et al. | 704/233 |
| 5,798,983 A * | 8/1998 | Kuhn et al. | 367/135 |
| 5,878,367 A | 3/1999 | Lee et al. | 701/117 |
| 6,198,693 B1 * | 3/2001 | Marash | 367/125 |

FOREIGN PATENT DOCUMENTS

| | | |
|---|---|---|
| JP | 5-54292 | 3/1993 |
| JP | 05087903 | 4/1993 |
| JP | 5-114098 | 5/1993 |
| JP | 5-119151 | 5/1993 |

OTHER PUBLICATIONS

English Translation of JP 5–114098, May 1993.*
Zamojski W et al: "Mobile object localisation based on acoustic information" ISIE. IEEE International Symposium on Industrial Electronics. Conference Proceedings, XX, XX, vol. 3, 1997, pp. 813–818, XP002165228.

* cited by examiner

Primary Examiner—Michael Nghiem
(74) Attorney, Agent, or Firm—Clark & Brody

(57) ABSTRACT

A method and apparatus enabling information including respective angular directions to be obtained for one or more sound sources includes a sound source direction estimation section for frequency-domain and time-domain processing of sets of output signals from a microphone array to derive successive estimated angular directions of each of the sound sources. The estimated directions can be utilized by a passage detection section to detect when a sound source is currently moving past the microphone array and the direction of the sound source at the time point when such passage detection is achieved, and a motion velocity detection section which is triggered by such passage detection to calculate the velocity of the passing sound source by using successively obtained estimated directions. In addition it becomes possible to produce directivity of the microphone array, oriented along the direction of a sound source which is moving past the microphone array, enabling accurate monitoring of sound levels of respective sound sources.

50 Claims, 25 Drawing Sheets

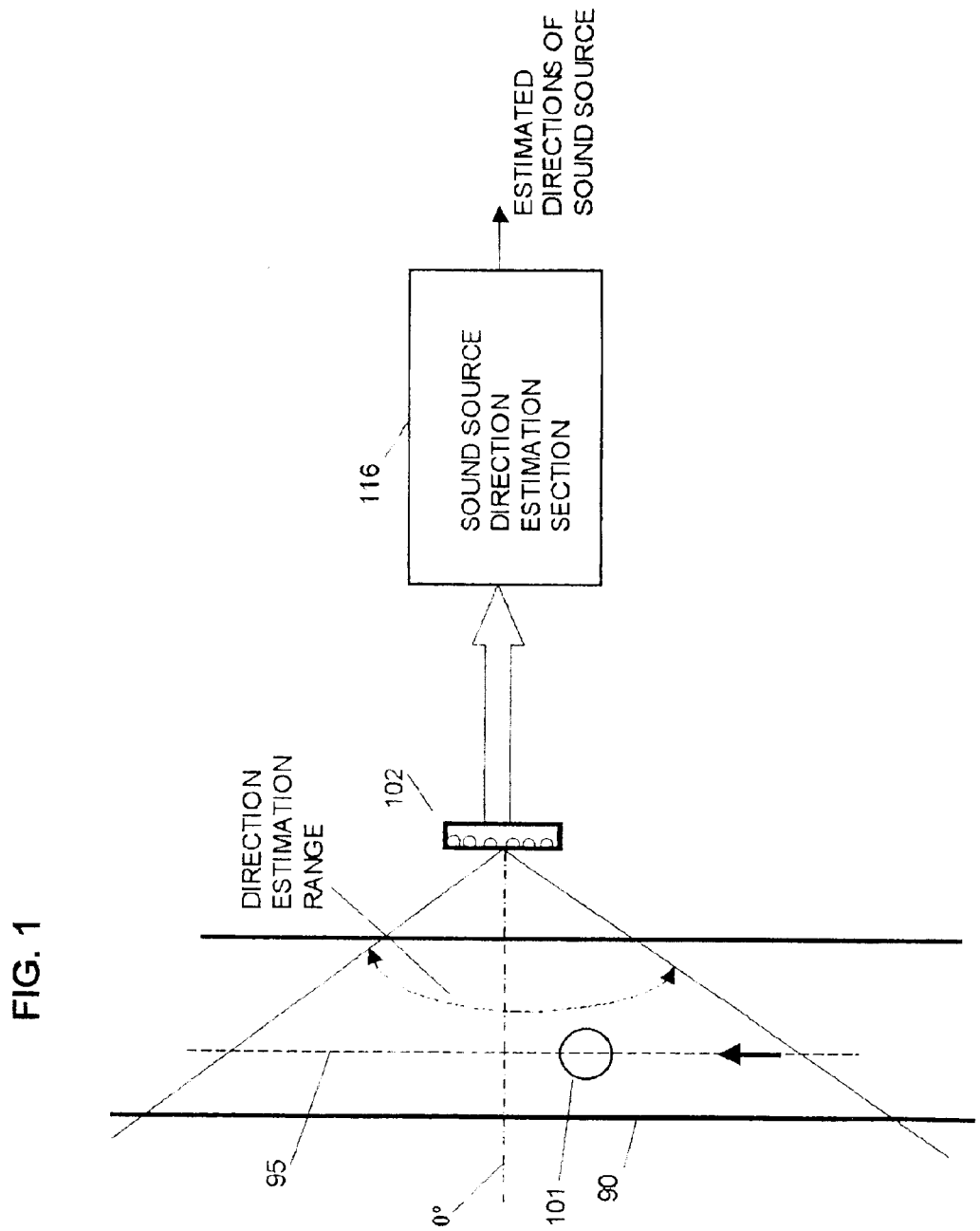

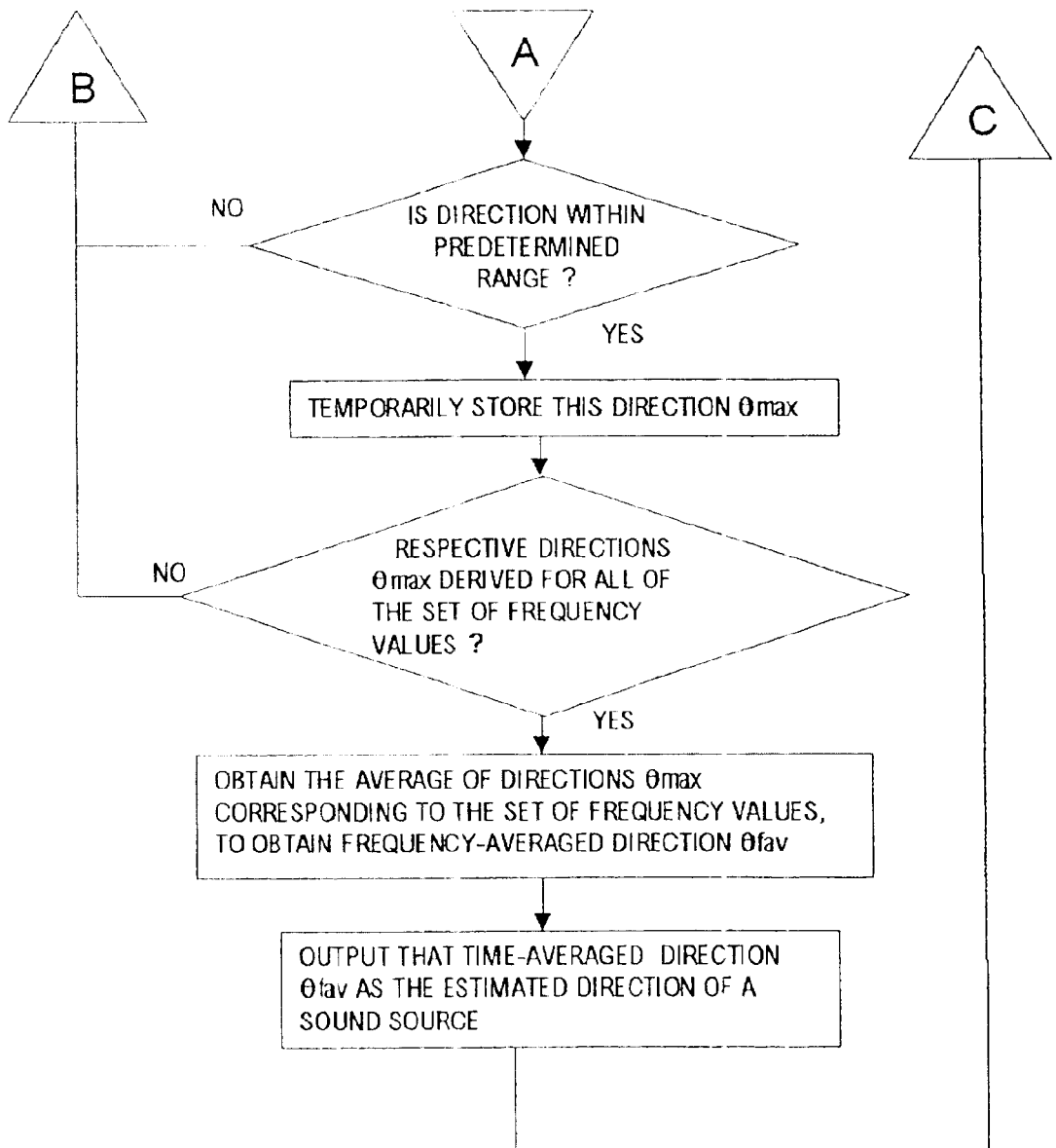

METHOD AND APPARATUS FOR CONCURRENTLY ESTIMATING RESPECTIVE DIRECTIONS OF A PLURALITY OF SOUND SOURCES AND FOR MONITORING INDIVIDUAL SOUND LEVELS OF RESPECTIVE MOVING SOUND SOURCES

BACKGROUND OF THE INVENTION

1. Field of the Invention

The present invention relates to a method and apparatus for estimating the respective angular directions of one or more sound sources in relation to a specific position, and to a method and apparatus for using such estimated directions to detect when a moving sound source has moved through a specific angular direction and to monitor the sounds emitted from respective ones of a plurality of moving sound sources.

2. Description of the Prior Art

One method of estimating the angular direction of a sound source and of monitoring a sound source is described in Japanese patent HEI 5-114098. FIG. 22 shows the configuration of this prior art sound source direction estimation apparatus. In FIG. 22, first and second directional microphones 901 and 902 are set up spaced apart by a fixed distance L, along a line of flow of traffic. The sounds which are respectively gathered by these microphones, which can be referred to as traffic noise A and traffic noise B, are respectively amplified by amplifier circuits 903, 904, and the resultant signals are alternately selected by a changeover circuit 905, under the control of a timing control circuit 910, to be successively subjected to frequency analysis by a frequency analysis circuit 906. Frequency vector distributions SA and SB are thereby respectively obtained, corresponding to traffic noise A and traffic noise B. Next, the degree of similarity between the frequency vector distributions SA and SB is detected, and the time difference dt between the points at which the frequency vector distributions SA and SB become approximately identical is obtained, by a time difference detection circuit 908. A time difference/velocity converter circuit 909 then performs the calculation:

$$V = L/dt$$

to determine the velocity of the sound source, and displays this velocity value by a display circuit 911. In addition, the direction of the sound source can be calculated, based on the aforementioned time difference. In that way, with this prior art method, it is possible to estimate the angular direction of a sound source and to monitor the sound emitted from that sound source.

However with such a prior art type of sound source direction estimation method, when sounds from a plurality of sources are simultaneously reaching the microphones, or when there is a sound source other than the sound sources which it is desired to monitor, then the accuracy of estimating the direction of a sound source will become low.

In the following specification and appended claims, the term "direction" is to understood as signifying "angular direction with respect to a specific origin point", unless used in referring to a direction of angular motion or direction of linear motion.

SUMMARY OF THE INVENTION

It is an objective of the present invention to overcome the above problems of the prior art, by providing a method and apparatus for sound source direction estimation which enables the direction of a sound source in relation to a specific point to be accurately estimated even when there is a plurality of sound sources in the vicinity, or a sound source of a type other than other than desired sound sources.

It is a further objective to provide such a method and apparatus whereby respective directions of a plurality of sound sources can be concurrently estimated.

It is moreover an objective to provide a method and apparatus for utilizing these estimated directions to detect when a sound source has moved through a specific direction in relation to a fixed position, and thereby detect that the sound source has moved past that specific position.

It is moreover an objective to provide a method and apparatus for utilizing these estimated directions to detect whether a sound source is in motion, and if so, the motion direction and velocity.

It is moreover an objective to provide a method and apparatus for utilizing these estimated directions to enable the sound emitted from a specific sound source to be monitored.

To achieve the above objective of obtaining estimated directions of one or more sound sources, with a sound source direction estimation method and apparatus according to the present invention, the input signals of an array of microphones are extracted in each of respective time windows, while in each of the time windows, respective sound source estimated directions are calculated for each of a frequency of a fixed set of frequencies, and the average of the directions thus calculated becomes the estimated direction corresponding to that time window. Since a sound source estimated direction is obtained based on a plurality of frequencies, a high degree of sound source direction estimation accuracy can be achieved.

To further increase the accuracy of sound source direction estimation, as each frequency-averaged estimated direction is obtained as described above for a time window, the average of the estimated direction obtained for the time window and the respectively estimated directions which have been calculated for a fixed plurality of time windows which precede that time window is calculated, to thereby obtain (for each of successive time windows) an estimated direction which is based on both frequency-averaging and time-averaging.

Furthermore, with such a sound source direction estimation method and apparatus according to the present invention, a judgement can be made as to whether the direction of a sound source has passed through a specific direction, and data expressing a passage detection result then generated to indicate that fact, by detecting whether a number of estimated directions obtained for that sound source which are each within a fixed range of directions and occur within a fixed observation interval exceeds a predetermined minimum number. In that way, it becomes possible to detect that a moving sound source is currently passing the microphone array.

Furthermore, with such a sound source direction estimation method and apparatus according to the present invention it becomes possible to judge the direction of motion of a sound source, when a passage detection result corresponding to the sound source is generated, based upon the sign of the difference between estimated directions respectively obtained for the sound source before and at the time point at which the passage detection result is generated. For example, successive sets of obtained estimated directions can be temporarily set into a data buffer, so that when a passage detection result is obtained, the buffer contents will contain estimated directions which were obtained prior to the point of generating the passage detection result. Alternatively, it may be possible to achieve a similar effect by using an estimated direction which is obtained subsequent to the time at which the passage detection result is obtained.

Furthermore, if the distance between the microphone array and a line of motion of a stream of moving sound sources is known, then the estimated directions can be used to estimate the speed of (linear) motion of a sound source, using the time point at which a passage detection result corresponding to that sound source is generate. Specifically, the time taken for the estimated directions obtained for that sound source to move through a specific amount, or the amount by which the estimated directions change within a predetermined time interval, can be measured to thereby obtain the angular velocity of the sound source in relation to the microphone array. The approximate linear velocity of the sound source can thereby be calculated based on the distance to the line of motion of the sound source.

Furthermore, with a method and apparatus according to the present invention, it becomes possible to arrange that when it is detected that a sound source is currently moving past the microphone array (as indicated by a passage detection result), a directivity is established for the microphone array, aligned along the most recently obtained estimated direction of that sound source. If the microphone array is a fixed linear array, then a directivity within a range of approximately 180° can be selectively established by applying appropriate amounts of delay to the respective microphone output signals, and summing the delayed signals, with the resultant signal constituting a monitoring signal which conveys the sound being emitted from that specific sound source.

Alternatively, a plurality of fixed directivities for the microphone array can be predetermined. In that case, when a passage detection result is obtained for a sound source, the current estimated direction of the sound source can be used to select the one of the predetermined directivities that is closest to that estimated direction, and monitoring of the sound emitted from that sound source then performed. In that case it becomes possible to monitor sound sources which are moving at various substantially different velocities (and hence may vary substantially with respect to the estimated direction which is obtained for each sound source at the time point when passage of the sound source is detected) since it becomes unnecessary to establish a new microphone array directivity each time that monitoring is to be started.

BRIEF DESCRIPTION OF THE DRAWINGS

FIG. 1 is a conceptual diagram for use in describing the basic features of a first embodiment, for successively deriving-respective estimated directions of one or more sound sources in relation to a microphone array;

FIGS. 5A, 5B constitute a flow diagram of a processing sequence executed by the second configuration of the sound source direction estimation section;

DESCRIPTION OF PREFERRED EMBODIMENTS

First Embodiment

Figure 2A:
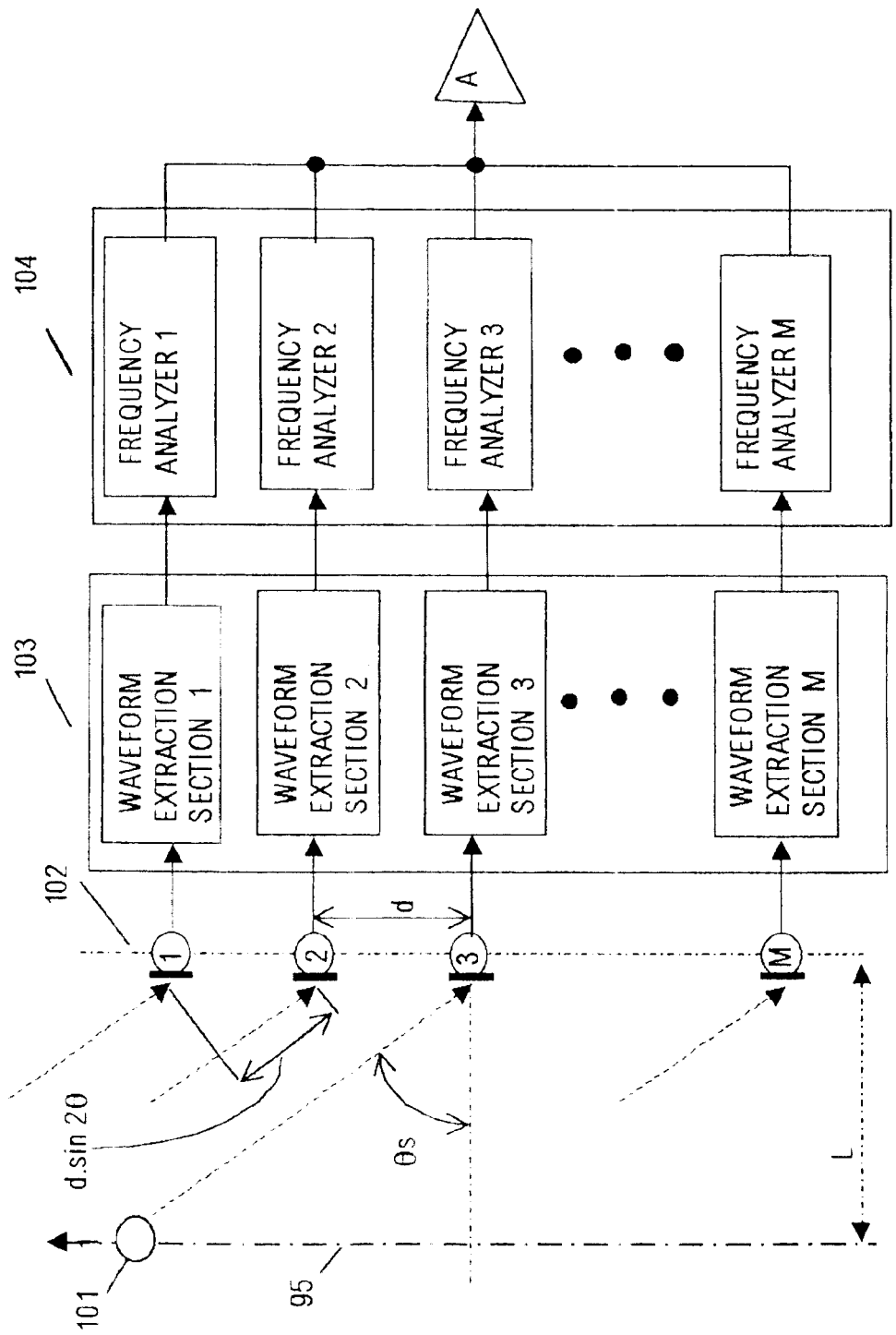
FIGS. 2A 2B constitute a general system block diagram of a first configuration of a sound source direction estimation section of the first embodiment, whereby estimated directions are derived in successive time windows by using both frequency-based and time-based averaging processing.

The basic features of a first embodiment of the invention will first be described referring to the conceptual diagram of FIG. 1. In FIG. 1, numeral 101 denotes a sound source such as a motor vehicle (as seen in plan view) travelling along a path 95 in the direction indicated by the arrow, for example along a road 90. A linear array of a plurality of microphones 102 is disposed adjacent to the path 95 with the array direction parallel to the path. Respective output signals from the microphones of array 102 are supplied to a sound source direction estimation section 116, in which the signals are processed to detect successive directions (expressed with respect to a specific point as origin, such as the location of a central microphone of the microphone array 102) of each of one or more sound sources such as the sound source 101 which are moving in the arrow direction along the path 95 within the indicated direction estimation range.

Each direction of a sound source will be assumed to be expressed as an angular displacement from a central direction (the direction indicated as "0°" in FIG. 1), with each direction expressed as a positive or negative angular displacement with respect to that central direction. As noted above, this use of the term "direction" when used alone, referring to an angular value, is to be distinguished from the term "direction of motion" of a sound source, such as the linear motion direction indicated by the arrow for the sound source 101 in FIG. 1.

The sound source direction estimation section 116 is capable of obtaining estimated directions of a sound source within a range which might for example be from +90° to −90°, or from +45° to −45°. However that range of directionality (in azimuth) may be restricted in order to eliminate extraneous noise sources, and in addition the range of directionality in elevation may also be restricted, for the same reason.

Figure 2B:
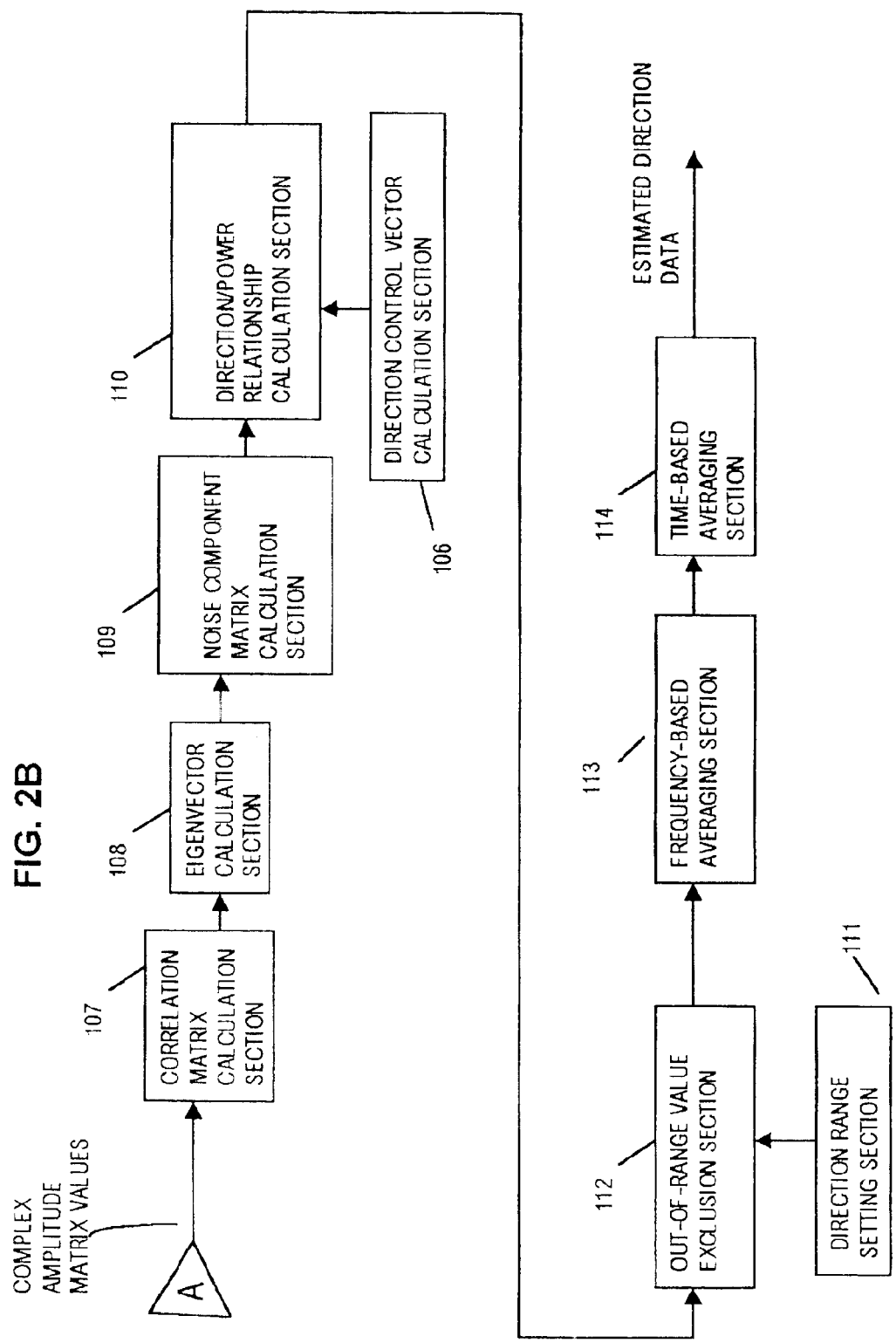
Figure 3A:
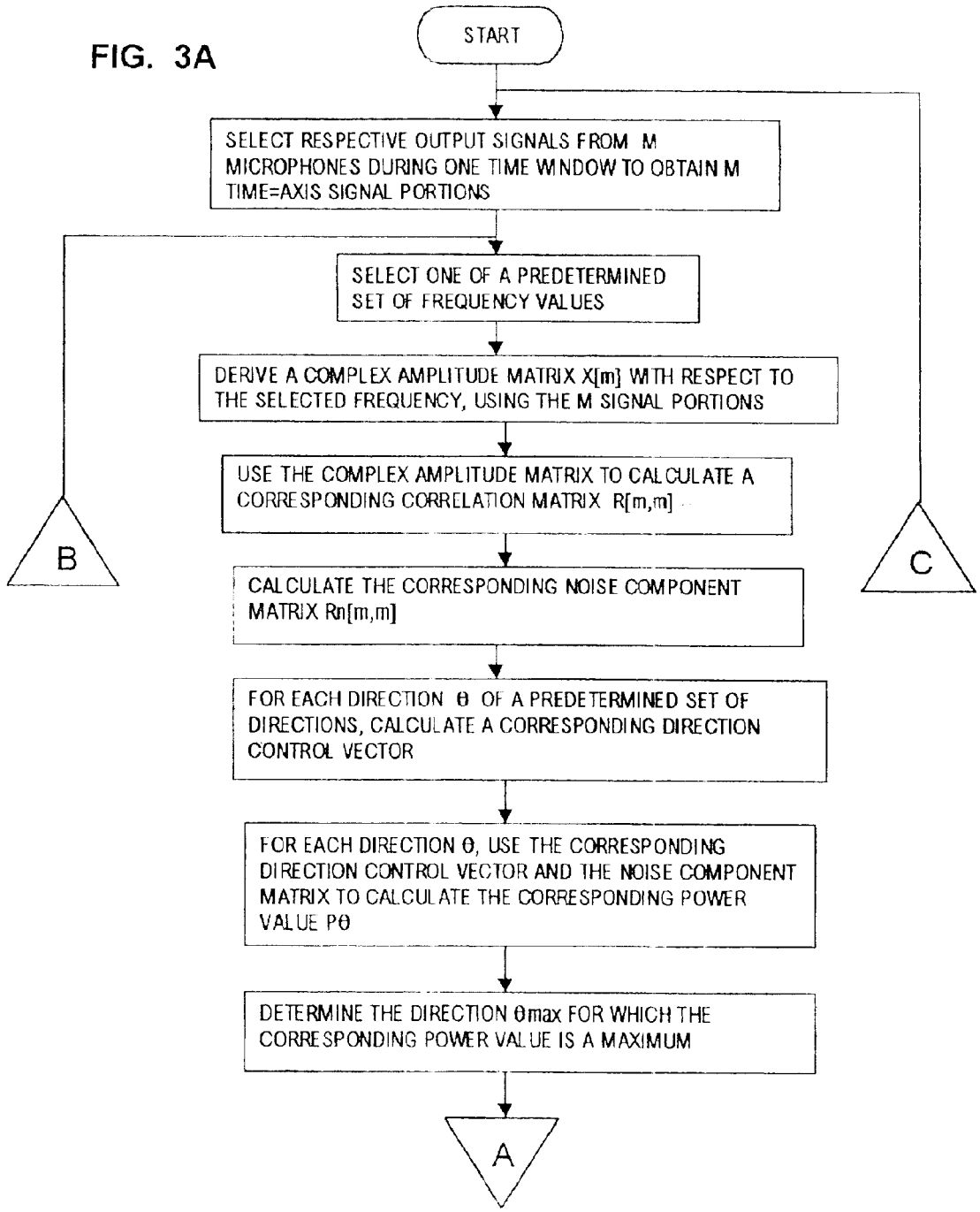
FIGS. 3A, 3B constitute a flow diagram of a processing sequence executed by the first configuration of the sound source direction estimation section.
Figure 3B:
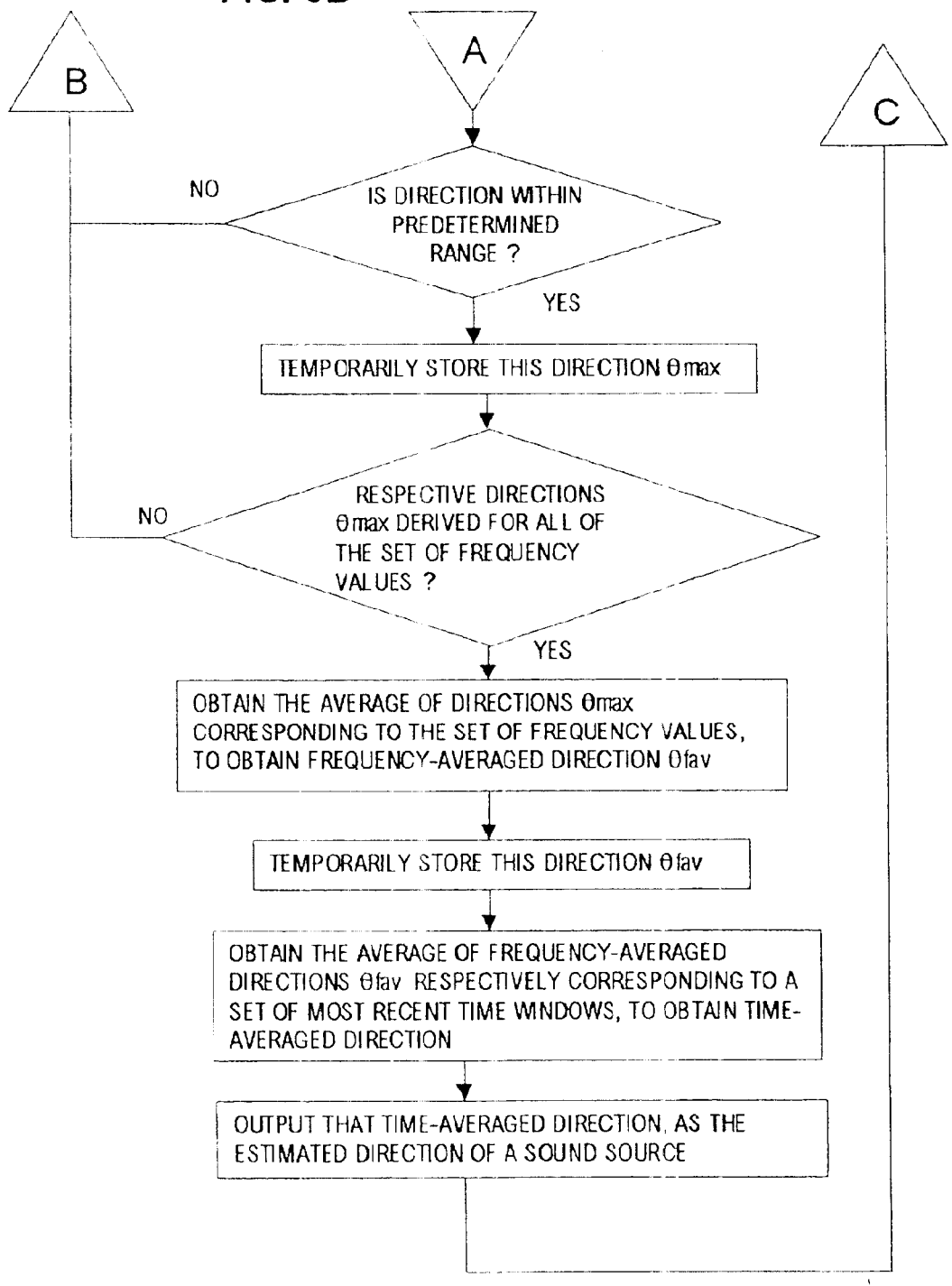

The configuration of the first embodiment will be described in greater detail referring to the general block diagram of FIGS. 2A, 2B. Here, a sound source 101 and microphone array 102 correspond to the identically numbered items shown in FIG. 1. In FIGS. 2A, 2B, the microphone array 102 is formed of M microphones which are spaced apart at regular spacings d. The respective output signals from the array of microphones 102 are transferred through M waveform extraction sections 103 of a sound source direction estimation section 116 to be supplied to M frequency analyzers 104 respectively. For each frequency of a predetermined set of frequencies, a corresponding complex amplitude matrix is derived by the frequency analyzers 104. A correlation matrix calculation section 107 derives, for each such complex amplitude matrix, a corresponding correlation matrix. Each such correlation matrix (i.e., each matrix corresponding to a specific frequency value) is operated on by an eigenvector calculation section 108 to calculate a corresponding set of eigenvectors. The eigenvector calculation section 108 supplies the calculated eigenvectors to a noise component matrix calculation section 109, and each noise component matrix which is thereby derived (again, corresponding to a specific frequency) is supplied to a direction/power relationship calculation section 110. A plurality of direction control vectors are also supplied to the direction/power relationship calculation section 110, from a direction control vector calculation section 106.

Output values produced from the direction/power relationship calculation section 110 are supplied to an out-of-range value exclusion section 112, together with data expressing a predetermined range of directions, produced by a direction range setting section 111. Output values produced from the out-of-range value exclusion section 112 are supplied to a frequency basis averaging section 113, and resultant output values are supplied to a time basis averaging section 114. Resultant output values produced from the time basis averaging section 114 express respective estimated directions of sound sources, i.e., these constitute the output data which are generated by the sound source direction estimation section 116.

The operation of this embodiment is as follows. The microphone array 102 is formed of M microphones which are arranged at regular spacings d along a straight line. The output signals from these M microphones are periodically extracted in respective time windows, each time window having a duration W, by the waveform extraction sections 103. The time window shape can be rectangular, or alternatively a shape such as that of a Hamming window could be used, in which the amplitude is made smaller at the opposing ends of the window. If the time window length W is made relatively small, then the accuracy is lowered, while if W is made relatively large then it becomes less possible to follow a sound source which moves rapidly. Thus the time window length W must be appropriately selected in accordance with the anticipated speed of motion of the sound sources whose sounds are to be monitored. For example, in the case of estimating the direction of a sound source which moves at a velocity of 40 km per hour and whose motion path is spaced apart from the microphone array 102 by a distance L which is equal to 10 meters, then a suitable value for the time window length W is in the range 2 to 10 ms. In addition, a suitable value for the extraction period (i.e., repetition period of the time windows) would be in the range W/2 to 2 W.

At each time window, the frequency analyzers 104 operates on each set of microphone signal portions (which can be considered as respective time-axis signal portions) that are extracted by the waveform extraction sections 103, to calculate a plurality of sets of complex amplitude values, with each of these sets corresponding to one of the aforementioned predetermined set of frequency values. The FFT (Fast Fourier Transform) method can be used to calculate the complex amplitude values, or alternatively, if the number of frequencies for which the calculation must be performed is relatively small, the DFT (Discrete Fourier Transform) method could be applied.

Next, for each of the aforementioned set of frequencies, the values of received sound power (as represented by received signal power) for each of respective directions are calculated. If the wavelength of a frequency is less than twice the value of the spacing d between adjacent microphones of the microphone array 102, then the higher the frequency, the greater will be the estimation accuracy. For that reason, in practice, frequencies having a wavelength value in the range 2d to 10d are suitable. For any specific frequency, the complex amplitude matrix is calculated, and this is expressed as a vector X[m], by the following equation (1).

$$X[m] = [x1, x2, \ldots, x_M]^T \qquad (1)$$

Here, xm (m=1 to M) are the respective complex amplitudes that are calculated for that specific frequency, based on the m output signals produced from the microphone array, and the superscript T signifies that X[m] is the transpose of the matrix [x1, x2, ..., $x_M$]. Next, equation (2) below is applied, to calculate the corresponding correlation matrix 107, expressed as the matrix R[m, m]:

$$R[m, m] = X[m] \cdot X[m]^H \qquad (2)$$

where m=1 to M. Here, the superscript H signifies the transposed complex conjugate. The eigenvector calculation section 108 then calculates the set of eigenvectors v1[m], v2[m], ... vM[m] (where m takes the values 1 to M) corresponding to the correlation matrix R[m, m].

Since the matrix R[m, m] is a Hermitian matrix, the calculation of the edge vectors can be performed by using the Householder method, which is known in this field of technology, to convert the matrix R to a symmetric tri-diagonal matrix, then applying the QL method (which is also well known in this field of technology) to obtain the eigenvectors.

The noise component matrix calculation section 109 then calculates the noise component matrix Rn[m, m] corresponding to the noise components of the microphone output signals, by using equation (3) below, assuming that there are K sound sources, where K is an integer.

$$Rn[m, m] = v_{K+1}[m] \cdot v_{K+1}[m]^H + v_{K+2}[m] \cdot v_{K+2}[m]^H + \ldots + v_M[m] \cdot v_M[m]^H \qquad (3)$$

The above equation assumes that the number of sound sources K is less than the total number of microphones in the microphone array 102, i.e., is no greater than M−1. If the number of sound sources cannot be estimated beforehand, then K should be set equal to M−1.

Next, to estimate the respective values of sound power received from respective directions, respective direction control vectors for each of a predetermined plurality of directions θ are calculated, where each of these is an angular direction, expressed in relation to a point on the microphone array. Each direction control vector is obtained as a column vector d[m], from equation (4) below:

$$d[m] = \left[1, e^{-j\omega\tau}, e^{-j\omega^2\tau}, \ldots, e^{-j\omega(M-1)\tau}\right]^T \qquad (4)$$

here, τ is defined by equation (5) below, in which c denotes the speed of sound:

$$\tau = (d \sin \theta)/c \qquad (5)$$

The direction/power relationship calculation section 110 calculates, for each of the directions θ, the corresponding power value P(θ), by using equation (6) below.

$$P(\theta) = 1/(d[m]^H \cdot Rn[m, m] \cdot d[m]) \qquad (6)$$

Typically, the set of directions θ will cover an angular range of −90° to +90°.

In that way, respective values of received sound power corresponding to different directions of a sound source are derived, for one specific frequency out of the aforementioned predetermined set of frequencies.

Next the direction θmax, i.e. the direction for which the highest value of received sound power P(θ) is obtained, is determined. The out-of-range value exclusion section 112 excludes θmax from the estimated direction values if it is outside a range of values that is set by the direction range setting section 111. The direction range setting section 111 sets that range based upon the range of possible locations of sound sources which are to be detected by the apparatus, if the latter range is known beforehand.

By the procedure described above, using a frequency which is measured within a specific time window, an estimated direction of a sound source can be calculated with respect to that specific frequency. That procedure is repeated for each of the aforementioned set of frequencies, for that same time window. The set of respective estimated directions θmax which are obtained for the entire set of frequency values are then averaged (i.e., by the frequency basis averaging section 113) to thereby derive an estimated direction of a sound source, as obtained using one specific time window.

As these estimated directions are successively derived by the frequency-based averaging section 113, they are stored in a buffer within the time-based averaging section 114, which is capable of holding a predetermined number of estimated direction values. Each time an estimated direction is newly derived by the frequency-based averaging section 113, i.e., for one specific time window, the set of estimated directions which are currently held in the buffer are read out, and the average of these estimated directions together with the most recently derived estimated direction is calculated.

In that way, each estimated sound source direction which is produced from the time-based averaging section 114 is obtained based upon results obtained from a plurality of successive time windows.

Thus with this embodiment of the invention, the signals from an array of microphones are periodically extracted using time windows, within each of the time windows an estimated direction is derived by using an average of respective estimated directions obtained using a plurality of frequencies, and as each such estimated direction is derived, it is averaged together with the estimated directions similarly obtained in a preceding plurality of time windows, to thereby obtain an accurate estimated sound source direction by performing averaging in both the frequency and time domains.

In the above it has been assumed that an estimated direction is to be derived for only one sound source at a time, i.e., that in each time window period a single maximum value of sound power is to be detected, and the direction corresponding to that maximum value derived as θmax. However in general there may be a plurality of sound sources (e.g., motor vehicles) within the range of directionality of the microphone array 102 at one time. In that case, respective local maximums of values of received signal power in relation to direction can be obtained for each of such sound sources, i.e. from the series of results that are obtained by successively applying the above equation (6) to each of the directions θ. In that way, it becomes possible to obtain a plurality of estimated directions concurrently for one time window, e.g., as θmax1, θmax2, etc., as respective directions corresponding to each of the local maximums of sound power.

Figure 4:
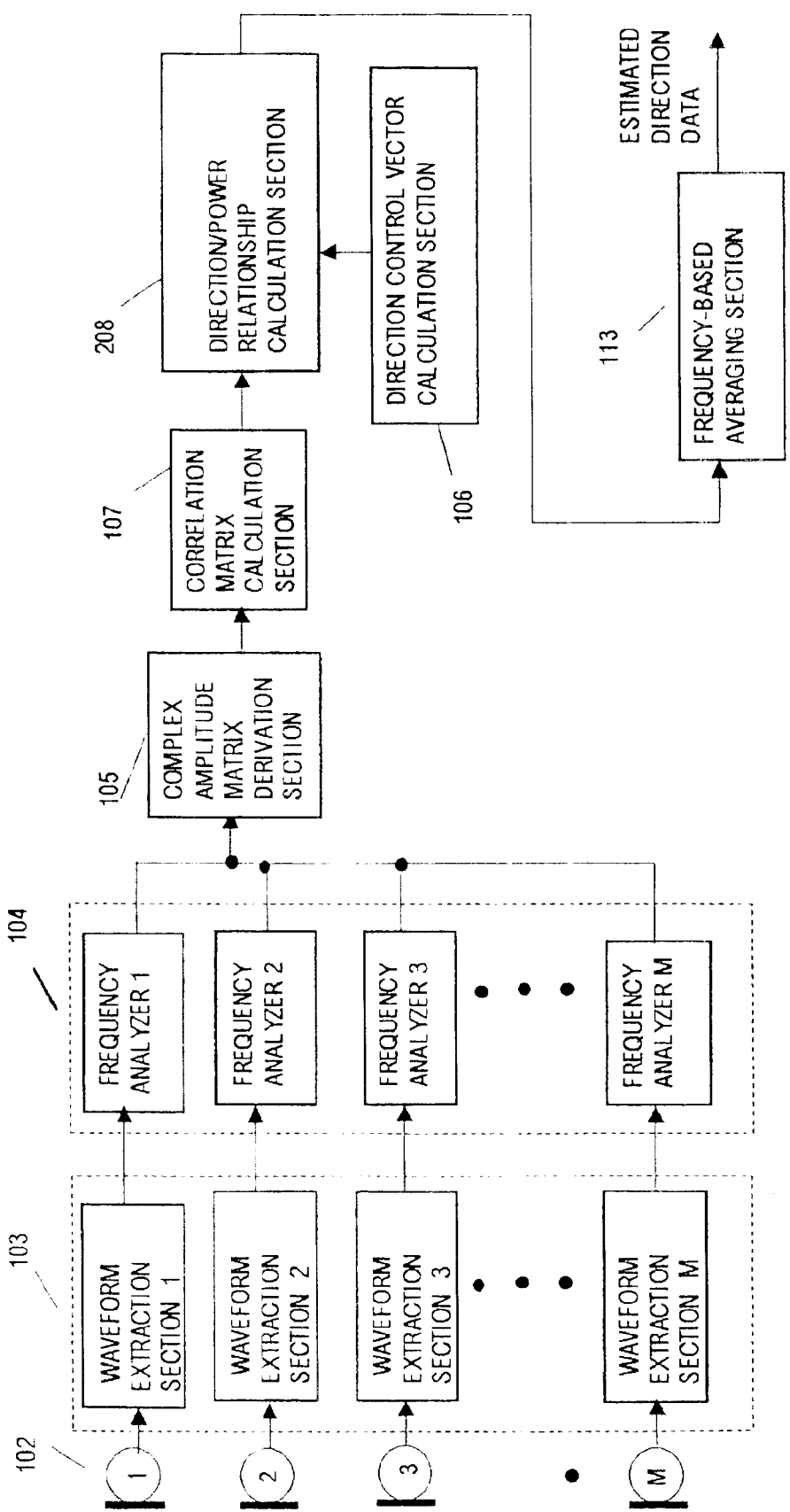
FIG. 4 constitutes a general system block diagram of a second configuration of the sound source direction estimation section of the first embodiment, whereby estimated directions are derived in successive time windows by using only frequency-based averaging processing.

An alternative configuration of this embodiment will be described in the following, referring first to the general system block diagram of FIG. 4. This is formed of a microphone array 102, a waveform extraction sections 103, a frequency analyzers 104, a correlation matrix calculation section 107, a direction control vector calculation section 106 and a frequency-based averaging section 113, whose respective functions and configurations are as described for the form of the embodiment shown in FIGS. 2A, 2B, together with a direction/power relationship calculation section 208. This form of the first embodiment differs from that of FIGS. 2A, 2B in the following respects. Firstly, the direction/power relationship calculation section 208 operates directly on each correlation matrix that is produced from the correlation matrix calculation section 107 for a specific frequency (in conjunction with a set of direction control vectors which are generated from the direction control vector calculation section 106) as described hereinabove, to derive a direction θmax, i.e., the direction for which the highest value of received sound power P(θ) is obtained at that particular frequency. Secondly, only frequency-based averaging of estimated directions is performed, to obtain (for each time window) a finally outputted estimated direction of a sound source.

As described hereinabove, for each of the aforementioned predetermined set of frequency values, a corresponding complex amplitude matrix is derived by the processing that is applied by the frequency analyzers 104 to a set of extracted audio signal portions from the respective microphones of array 102, and this matrix can be expressed as a vector X[m], as shown by the aforementioned equation (1). For each such complex amplitude matrix, the corresponding correlation matrix is then calculated by the correlation matrix calculation section 107, using equation (2) above, i.e., with the correlation matrix being expressed as R[m, m]. In addition, a set d[m] of direction control vectors are derived by the direction control vector calculation section 106 for a plurality of directions θ, by using equation (4) above, and supplied to the direction/power relationship calculation section 208.

The direction/power relationship calculation section 208 then uses the following equation (7) to calculate the sound power P(θ) at each of the plurality of directions θ for one specific frequency (i.e., directions covering an angular range which might be for example from +90° to −90°):

$$P(\theta)=d[m]^H \cdot Rn[m, m] \cdot d[m] \tag{7}$$

The direction θmax for which the maximum sound power level is obtained, at one specific frequency, is thereby determined.

The above procedure is repeated for each of the aforementioned predetermined set of frequencies. The average of the respective directions θmax obtained for the various frequencies is then derived by the frequency basis averaging section 113, to thereby obtain (for a specific time window) the estimated direction of a sound source.

Figure 5A:
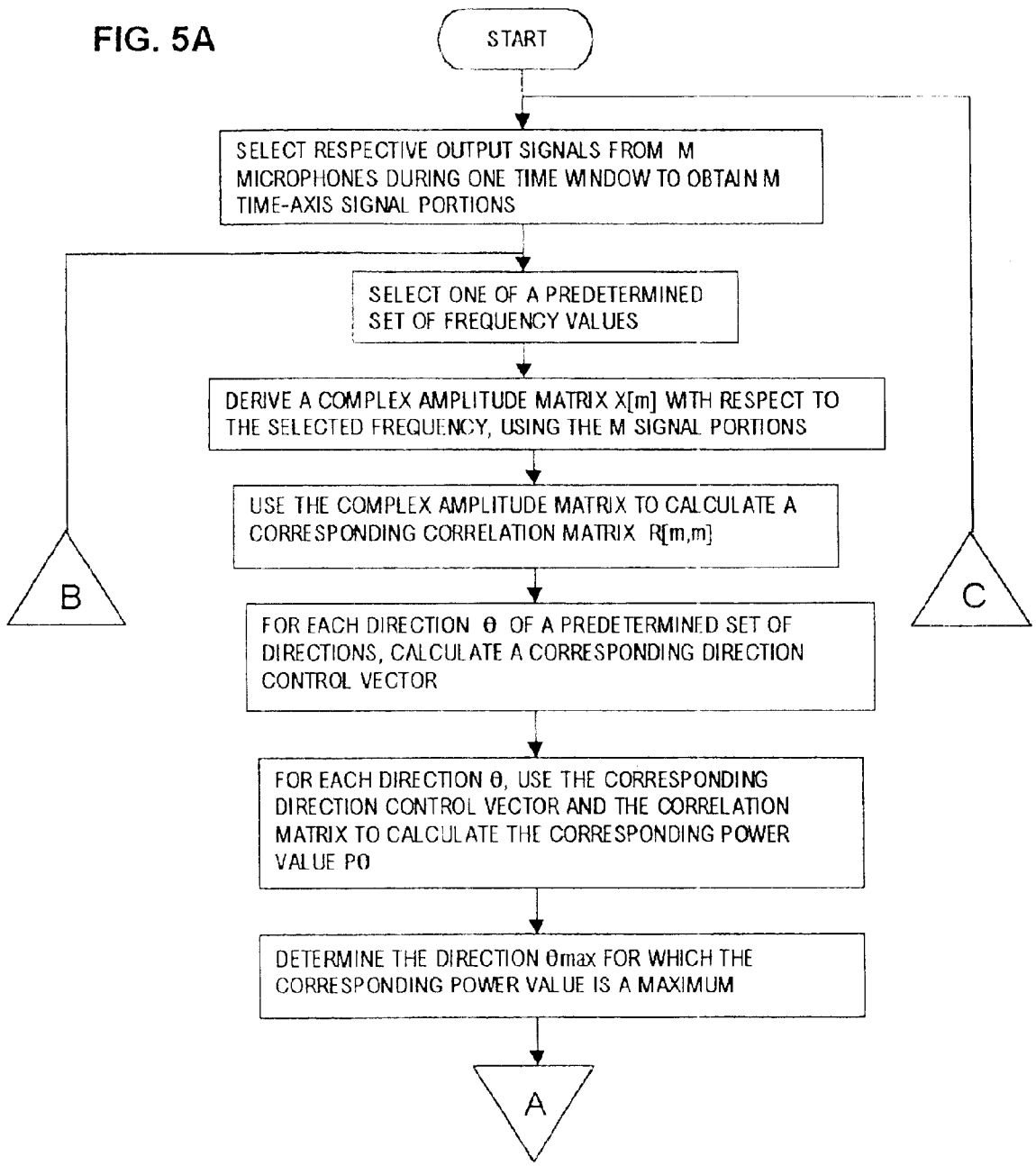

The processing sequence corresponding to the above is shown in the flow diagram of FIGS. 5A, 5B.

Second Embodiment

Figure 6:
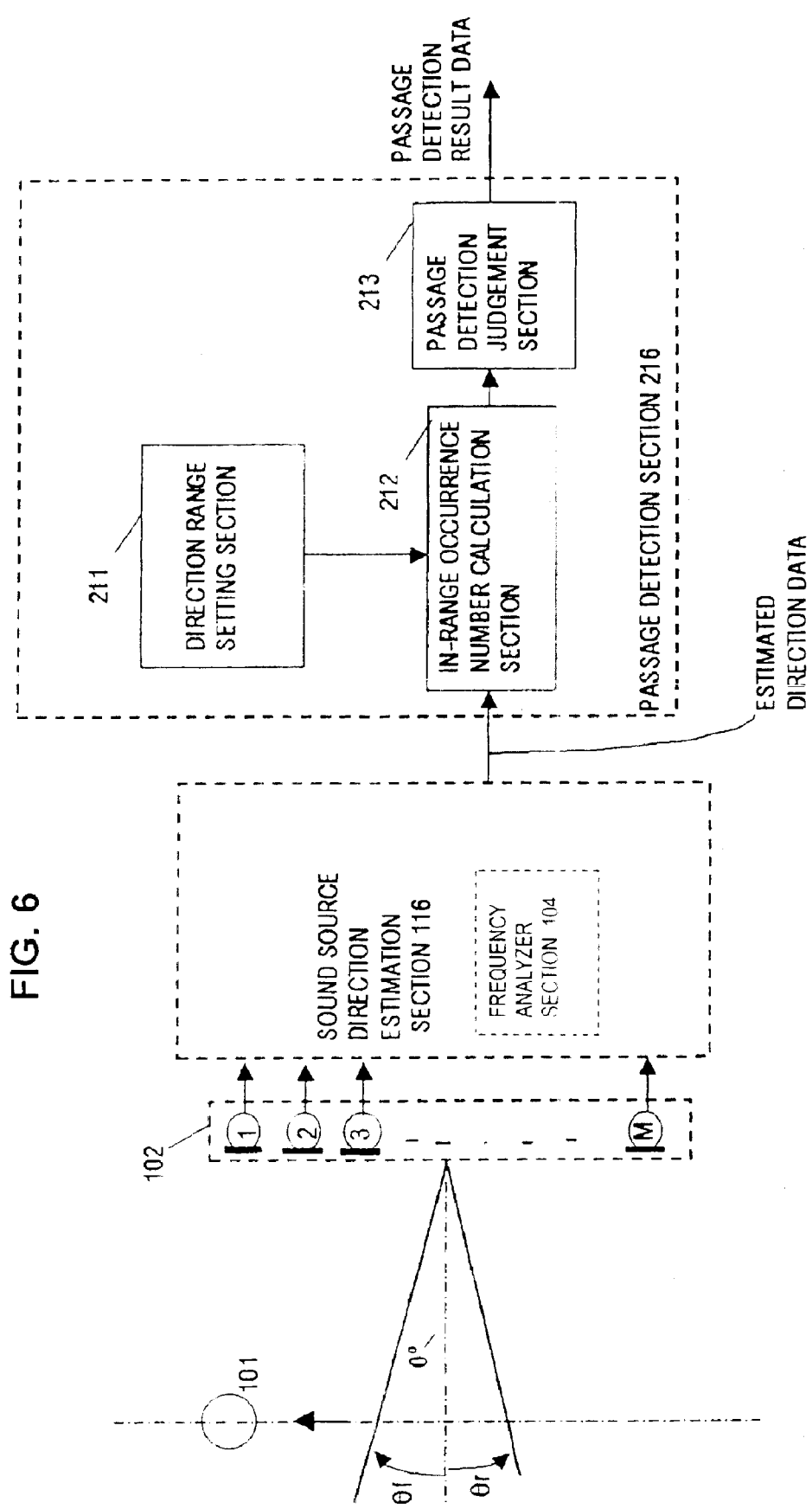
FIG. 6 is a general system block diagram of a second embodiment, having a sound source direction estimation section and a passage detection section for detecting when a moving sound source has passed through a specific direction in relation to a microphone array.

A second embodiment of the invention will be described referring first to the general system block diagram of FIG. 6. In FIG. 6, a microphone array 102 and a sound source direction estimation section 116 have the respective functions and configurations described hereinabove for the correspondingly numbered components of the first embodiment. The sound source direction estimation section 116 can have the first configuration shown in FIGS. 2A, 2B, whereby each output estimated direction is derived based upon frequency-based averaging and upon time-based averaging applied over a plurality of successive time windows, or can have the alternative configuration shown in FIG. 4, with only frequency-based averaging being applied. Data expressing respective estimated directions of a sound source are supplied from the sound source direction estimation section 116 to an in-range occurrence number calculation section 212 of a passage detection section 216, which also consists of a direction range setting section 211 and a passage detection judgement section 213. Data expressing a predetermined range of directions which will be designated as the passage detection range Pn, produced from the in-range occurrence number calculation section 212, are also supplied to the passage detection judgement section 213. That predetermined range of directions Pn is within, but no greater than, the entire range (such as from +90° to −90°) for which estimated directions can be derived by the sound source direction estimation section 116, and in FIG. 6 is shown as extending from an initial direction θr to a final direction θf. Data expressing a passage detection result is thereby obtained as output from the passage detection judgement section 213, i.e., data indicating that a sound source is currently passing by the microphone array 102.

Specifically, the in-range occurrence number calculation section 212 calculates, for a predetermined plurality N of successive time windows which begin when an estimated direction within the range Pn is first obtained for the sound source, the number of times that estimated directions of the sound source are within the passage detection range Pn. Designating that number of times as n, if n exceeds a predetermined reference level $n_t$, then the passage detection judgement section 213 judges that a sound source has passed through the range Pn (more specifically, has passed through at least the initial direction of that range) and hence produces data expressing a passage detection result, indicating that a sound source is currently passing by the microphone array 102.

Figure 7:
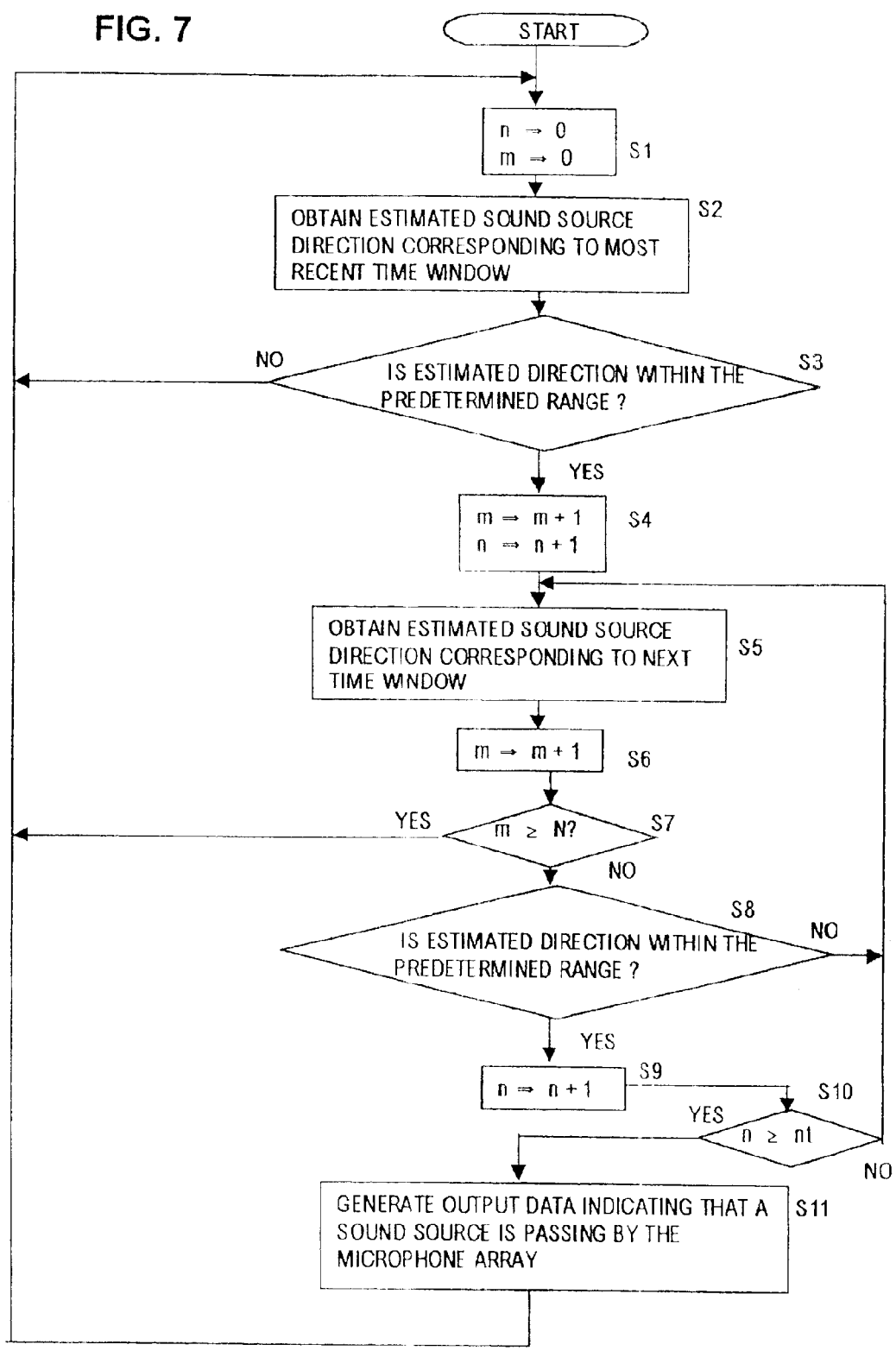
FIG. 7 is a flow diagram of a processing sequence executed by the second embodiment.

Appropriate values for the number of time windows N, and the reference value $n_t$ will depend upon the approximate motion speed which can be expected for the sound sources, and upon the distance L of the path of the sound sources from the microphone array 102. If for example L is 10 meters and the speed of motion of the sound sources can be expected to be approximately 40 km/hour, then a value for the number of time windows N in the range 10 to 40 and a value for the reference value $n_t$ of approximately 5 to 10 would be suitable FIG. 7 is a flow diagram of an example of an algorithm which could be used to implement the operation of this embodiment. To simplify the diagram, it is assumed that an estimated direction is obtained in every time window, although in practice this may not always occur. As shown, incrementing of count values m and n that are to be compared with the time window number N and the threshold value $n_t$, respectively, begins when it is judged in step S3 that an estimated sound source direction has come within the passage detection range Pn specified by the direction range setting section 211, i.e., when the sound source has reached or exceeded the direction θr shown in FIG. 6. When this is found, the loop of steps S5 to S11 is repetitively executed until it is found that the threshold number of in-range estimated directions $n_t$ has been reached before the number of successive time windows N has been reached (in which case a passage detection result is generated) or the number of time windows N is attained without that threshold number $n_t$ having been reached.

The configuration of the second embodiment described above is intended for application to sound sources which are travelling along a single direction, i.e., that indicated by the arrow on the path traveled by the sound source 101 in FIG. 6. In the case of passage detection of sound sources travelling on adjacent parallel paths but in opposite directions (e.g., as in the case of traffic along a two-way street) a single microphone array 102 would be utilized, however a second passage detection section 216 would be provided for detecting the passing of sound sources which travel in the second motion direction, as described in detail hereinafter with reference to an eighth embodiment.

Third Embodiment

Figure 8:
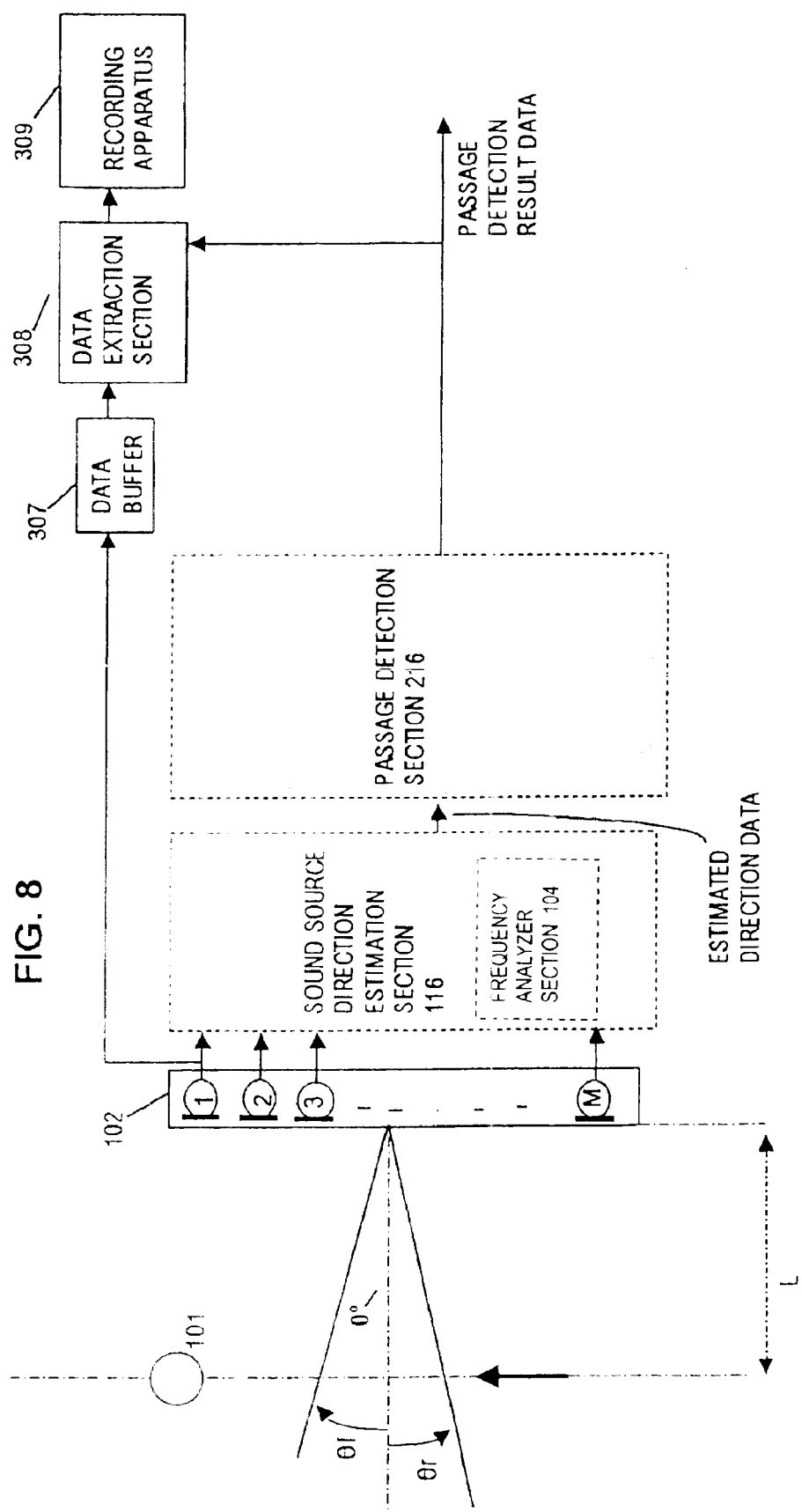
FIG. 8 is a general system block diagram of a third embodiment which includes a sound source direction estimation section, a passage detection section, and which derives and provides to a recording apparatus data expressing a level of sound power received from a specific sound source which is currently moving past a microphone array.

A third embodiment will be described referring to the general system block diagram of FIG. 8. As shown, this is formed of a microphone array 102, sound source direction estimation section 116 and passage detection section 216, together with a data buffer 307, a data extraction section 308 and a recording apparatus 309. The sound source direction estimation section 116 can have the first configuration shown in FIGS. 2A, 2B, whereby each output estimated direction is derived based upon frequency-based averaging and upon time-based averaging applied over a plurality of successive time windows, or can have the alternative configuration shown in FIG. 4, with only frequency-based averaging being applied. The passage detection section 216 has the configuration and operation described above for the preceding embodiment.

The operation of this embodiment is as follows. Data expressing respective passage detection results are supplied from the passage detection section 216 to the data extraction section 308, and the audio signal produced from one of the microphones of the array 102, which will be assumed to be the microphone in the No. 1 array position, is supplied to the data buffer 307, i.e., as successive digital data samples. (For simplicity of description, analog-to-digital converters for converting the microphone output signals to digital signals are omitted from the drawings). It would be equally possible to utilize a combination of output signals from more than one of the microphones. When a passage detection result is supplied to the data extraction section 308, it responds by reading out the data currently held in the data buffer 307 and supplying the data to the recording apparatus 309 to be recorded thereby.

The capacity of the buffer 307 is such that at any one time, the buffer holds an amount of audio data that has been generated within a specific time interval Tb. When the data extraction section 308 receives a passage detection result indicating that a sound source is passing by the microphone array 102, the data extraction section 308 reads out the contents of the data buffer 307 and transfers these to the recording apparatus 309, to be recorded. In that way, a signal expressing the sound emitted from a sound source which is currently passing the microphone array 102, covering a time interval of duration Tb and extending up to the time point of obtaining the passage detection result, is supplied to the recording apparatus 309. The sound produced from a moving sound source during a specific time interval, as it moves past the microphone array 102, can thereby be obtained and recorded.

Thus with this embodiment, in the same way as for the second embodiment, the direction of a sound source can be estimated and the passing of that sound source can be detected, while in addition, the output signal from at least one of microphone is utilized to monitor and record the sound produced from the passing sound source, with these operations being triggered by generation of a passage detection result.

Figure 9:
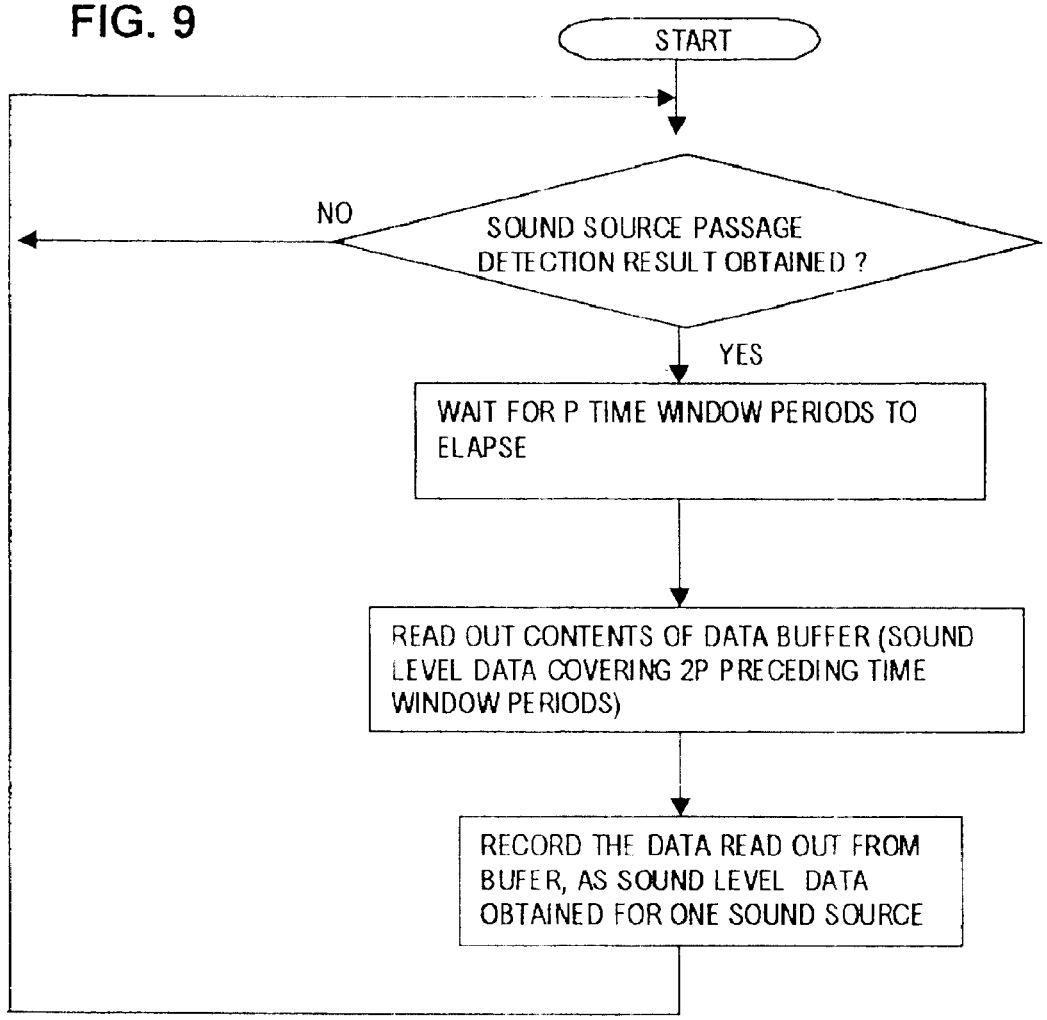
FIG. 9 is a flow diagram of a processing sequence executed by the third embodiment.

The processing sequence of the above operation is shown in the flow diagram of FIG. 9.

Fourth Embodiment

Figure 10:
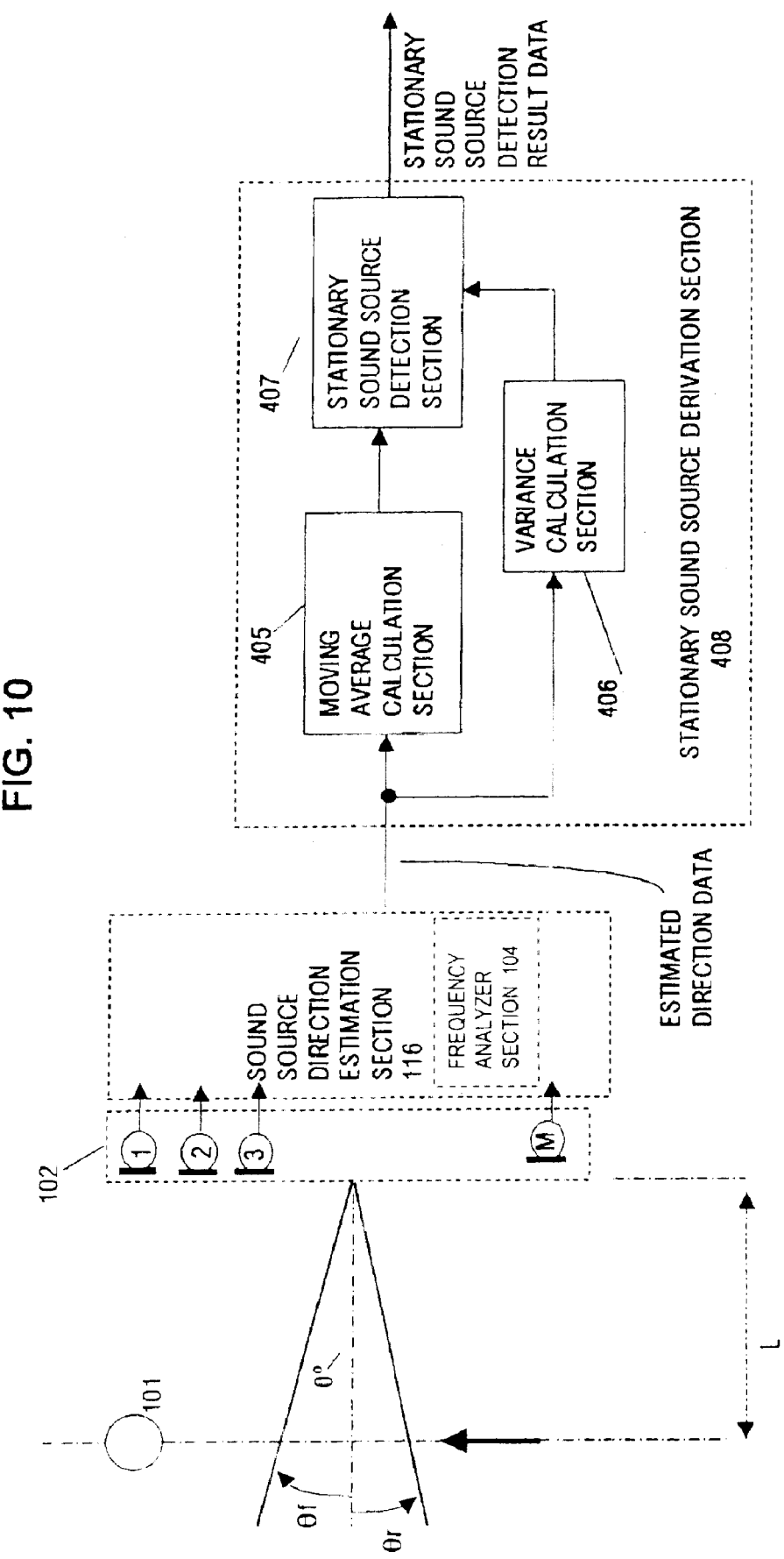
FIG. 10 is a general system block diagram of a fourth embodiment which includes a sound source direction estimation section, and serves to detect the presence of a stationary sound source.

A fourth embodiment will be described referring first to the general system block diagram of FIG. 10. As shown, this is formed of a microphone array 102 and a sound source direction estimation section 116, together with a stationary sound source derivation section 408 which is formed of a moving average calculation section 405, a variance calculation section 406 and a stationary sound source detection section 407. The sound source direction estimation section 116 can have the first configuration shown in FIGS. 2A, 2B, whereby each output estimated direction is derived based upon frequency-based averaging and upon time-based averaging applied over a plurality of successive time windows, or can have the alternative configuration shown in FIG. 4, with only frequency-based averaging being applied.

The data expressing respective estimated directions produced from the sound source direction estimation section 116 are inputted to each of the moving average calculation section 405 and the variance calculation section 406 of the stationary sound source derivation section 408. The respective outputs from the moving average calculation section 405 and variance calculation section 406 are inputted to the stationary sound source detector 407. When occurrence of a stationary sound source is detected, the stationary sound source detector 407 generates output data indicative of that detection result.

In the stationary sound source detection section 408, the moving average calculation section 405 calculates the moving average of successive sets of sound source estimated directions produced from the sound source direction estimation section 116, in each of successive fixed-duration observation intervals, and the variance calculation section 406 calculates the variance of the successive estimated directions. The stationary sound source detector 407 judges that a sound source is stationary if the variance that is calculated by the variance calculation section 406 is found to be lower than a reference value. If a moving average of the estimated directions is found to be outside a predetermined range of possible directions for the sound source, then the corresponding variance value is discarded.

In that way, the stationary sound source detector 407 can reliably detect the occurrence of a stationary sound source that is located within the range of directionality of the microphone array 102. In addition, the estimated direction which is produced from the sound source direction estimation section 116 at the time when such detection occurs represents the direction of that stationary sound source.

Fifth Embodiment

Figure 11:
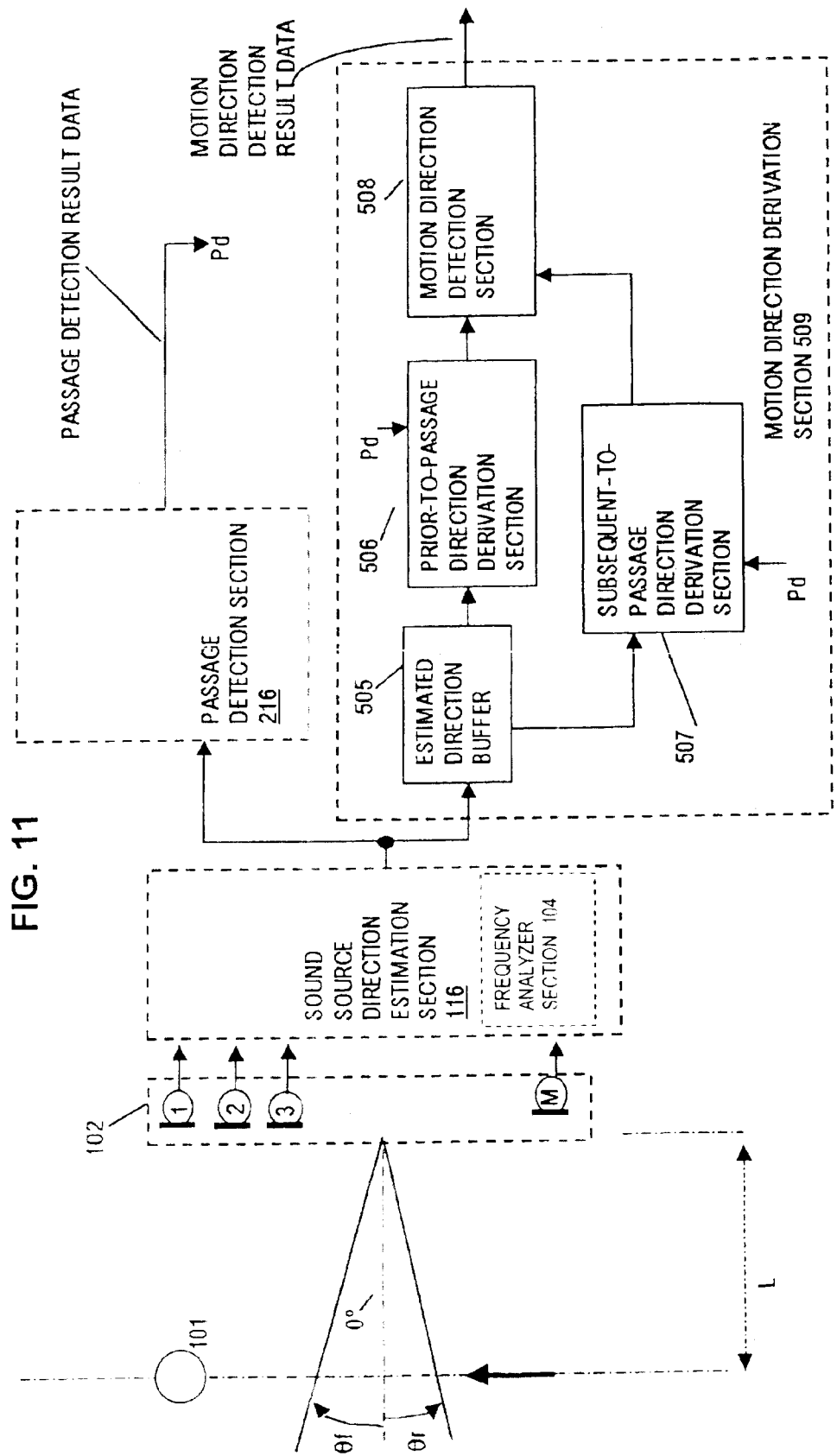
FIG. 11 is a general system block diagram of a fifth embodiment, which includes a sound source direction estimation section, a passage detection section, and a motion direction derivation section which derives data expressing the direction of motion of a sound source which is currently moving past a microphone array.

A fifth embodiment will be described referring to the general system block diagram of FIG. 11 and the flow diagram of FIG. 12. The embodiment is formed of a microphone array 102, a sound source direction estimation section 116, a passage detection section 216, each of which operates as described hereinabove for correspondingly numbered sections of preceding embodiments, and a motion direction derivation section 509. The motion direction derivation section 509 is formed of a estimated direction buffer 505, a prior-to-passage direction derivation section 506, a subsequent-to-passage direction derivation section 507 and a motion direction detection section 508. In the same way as described for the second embodiment, estimated directions obtained by the sound source direction estimation section 116 in successive time windows are supplied to the passage detection section 216, with a passage detection result being generated by the passage detection section 216 each time it is detected that a sound source has entered the passage detection range Pn. In the motion direction derivation section 509, the estimated direction buffer 505 is configured to have a storage capacity corresponding to an appropriate number of successively obtained estimated directions.

When data expressing a passage detection result (indicated as Pd in FIG. 11) is generated by the passage detection section 216, this is supplied to the prior-to-passage direction derivation section 506 and the subsequent-to-passage direction derivation section 507. The subsequent-to-passage direction derivation section 507 responds by transferring to the motion direction detection section 508 the estimated direction which was most recently set into the buffer 505, or the most recently obtained estimated direction produced from the passage detection section 216. The prior-to-passage direction derivation section 506 responds to the passage detection result by transferring to the motion direction detection section 508 an estimated direction which was obtained prior to that which is transferred by the subsequent-to-passage direction derivation section 507, such as the oldest estimated direction in the contents of the buffer 505. Designating these respective estimated directions extracted by the prior-to-passage direction derivation section 506 and subsequent-to-passage direction derivation section 507 as θbf and θaf, the motion direction detection section 508 then obtains the sign of the difference between θbf and θaf, with that sign indicating the direction of motion of the sound source. For example in the case of FIG. 11, if (θaf−θbf) is positive, then this indicates that the motion direction of the sound source is along the direction of the arrow.

Figure 12:
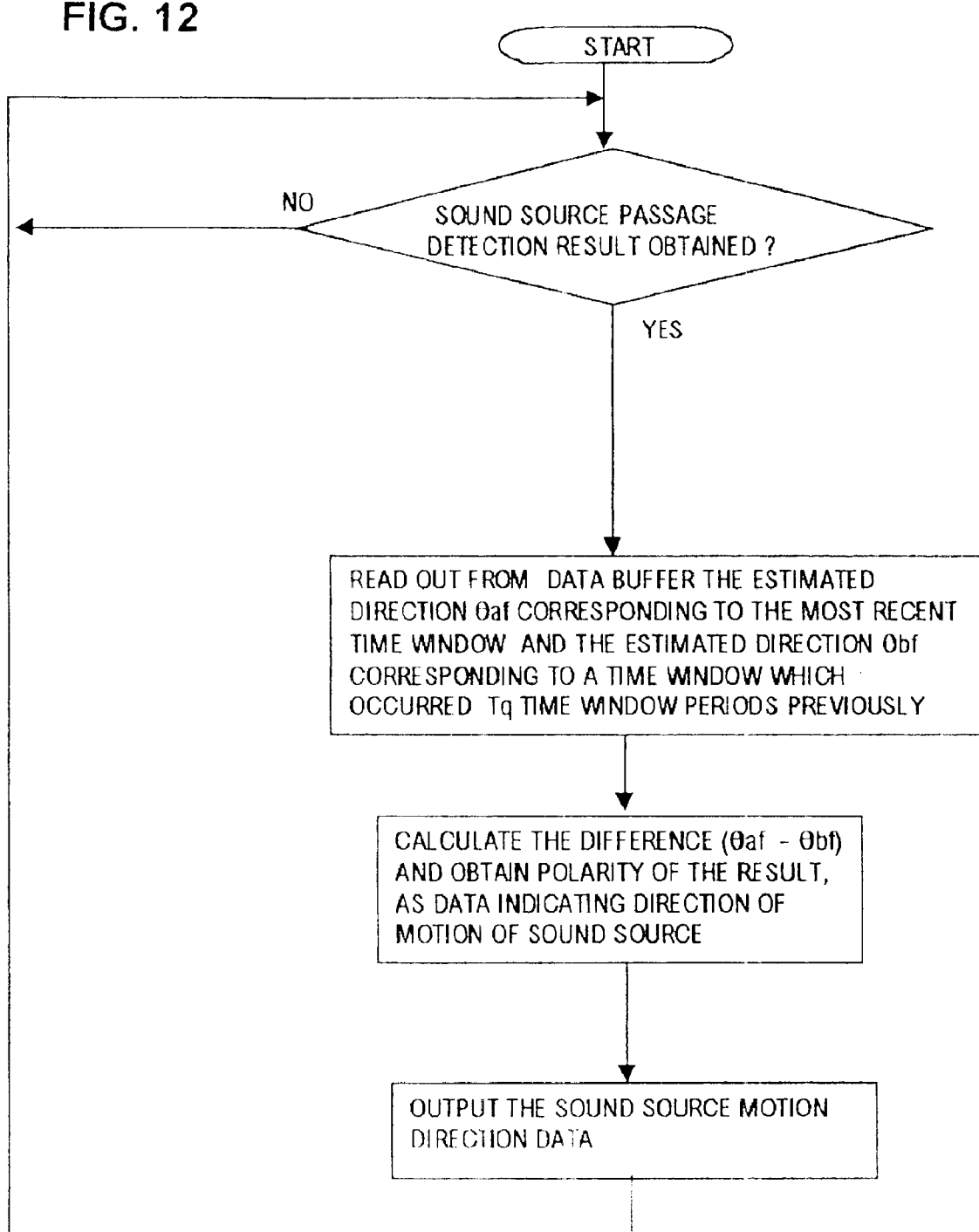
FIG. 12 is a flow diagram of a processing sequence executed by the fifth embodiment.

FIG. 12 is a flow diagram showing the processing executed with the above form of operation of this embodiment.

In the above description of the fifth embodiment, a data buffer 505 such as a FIFO (first-in first-out) buffer is used to obtain an estimated direction that was produced at a time prior to the point in time at which a passage detection result was generated. However it will be understood that as an alternative form of implementing this embodiment, it would be equally possible to register the estimated direction that is obtained at the time point when a passage detection result is generated, to wait for a predetermined number of time window periods and obtain the estimated direction which is produced at that time point from the passage detection section 216, and subtract the two estimated directions thus obtained from one another, to thereby obtain the motion direction of a sound source as indicated by the sign of the subtraction result.

As a further alternative form of implementing this embodiment, it would be possible to use a buffer as described for the estimated direction buffer 505 to obtain an estimated direction which was produced by the passage detection section 216 at a time point prior to the time point when a passage detection result is generated, to wait for a predetermined number of time window periods after a passage detection result is generated and then obtain the estimated direction which is produced at that time point from the passage detection section 216, and subtract the earliest and most recent estimated directions thus obtained from one another, to thereby obtain the motion direction of a sound source as indicated by the sign of the subtraction result.

It can thus be understood that whichever of the above alternatives is employed, each is based upon using a passage detection result as an indication that a sound source has traversed a specific range of directions, and so is currently moving past the microphone array 102.

Sixth Embodiment

Figure 13:
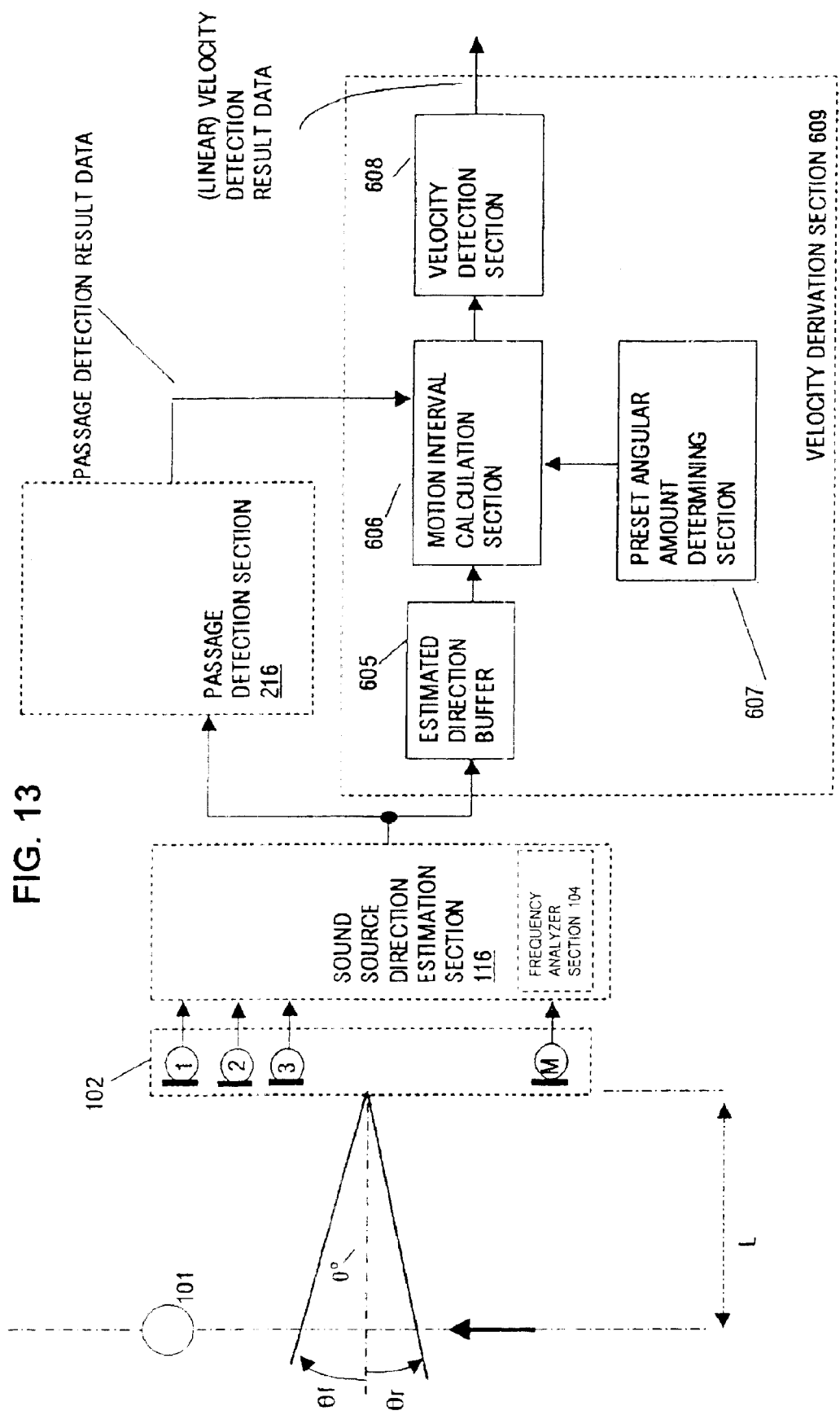
FIG. 13 is a general system block diagram of a sixth embodiment, which includes a velocity detection section for operating on passage detection results obtained by a passage detection section and estimated directions obtained by a sound source direction estimation section to obtain the velocity of a sound source which is currently moving past a microphone array.

A sixth embodiment will be described referring to the general system block diagram of FIG. 13 and the flow diagram of FIG. 14. The embodiment is formed of a microphone array 102, a sound source direction estimation section 116, a passage detection section 216, each of which operates as described hereinabove for correspondingly numbered sections of preceding embodiments, and a velocity derivation section 609. The velocity derivation section 609 is formed of a data buffer 605, a motion interval calculation section 606, an angular amount determining section 607 and a velocity derivation section 609. The velocity derivation section 609 operates on data provided from the sound source direction estimation section 116 and passage detection section 216 to determine the velocity of a sound source which moves past the microphone array 102.

The operation is as follows. The successive estimated directions of a sound source, produced from the sound source direction estimation section 116, are supplied to the passage detection section 216 and to the data buffer 605 of the velocity derivation section 609. The data buffer 605 is capable of storing data expressing a fixed plurality of successively obtained estimated directions of a sound source, with the number of estimated directions being predetermined in accordance with an anticipated typical or maximum velocity of the sound sources and in accordance with the magnitude of a fixedly predetermined angular amount Ω (described hereinafter). Successively obtained estimated directions of a sound source, corresponding to respective time windows, are sequentially written into the buffer 605. When the passage detection section passage detection section 216 detects that a sound source is moving past the microphone array 102 (as indicated by generation of a passage detection result), then the contents of the data buffer 605 at that time are read out by the motion interval calculation section 606.

The motion interval calculation section 606 then determines, based on the set of past estimated directions respectively corresponding to successive time points which are thereby obtained, the length of time T (i.e., expressed as a number of time window periods) which was required for the sound source to move through a preset angular amount (i.e., range of successive directions with respect to the microphone array 102) designated as Ω, which is specified by the angular amount determining section 607.

The velocity detection section 608 then calculates the angular velocity at which the sound source is moving, based on the angular amount Ω and the value obtained for T, by using equation (8) below:

$$\omega = \Omega/T \tag{8}$$

The distance L between the microphone array 602 and the sound source 601 is known beforehand. The velocity detection section 608 calculates the linear velocity V of the sound source by using equation (9) below:

$$V = L\tan(\omega) \tag{9}$$

Data expressing the calculated velocity value are the outputted from the velocity detection section 608.

Figure 14:
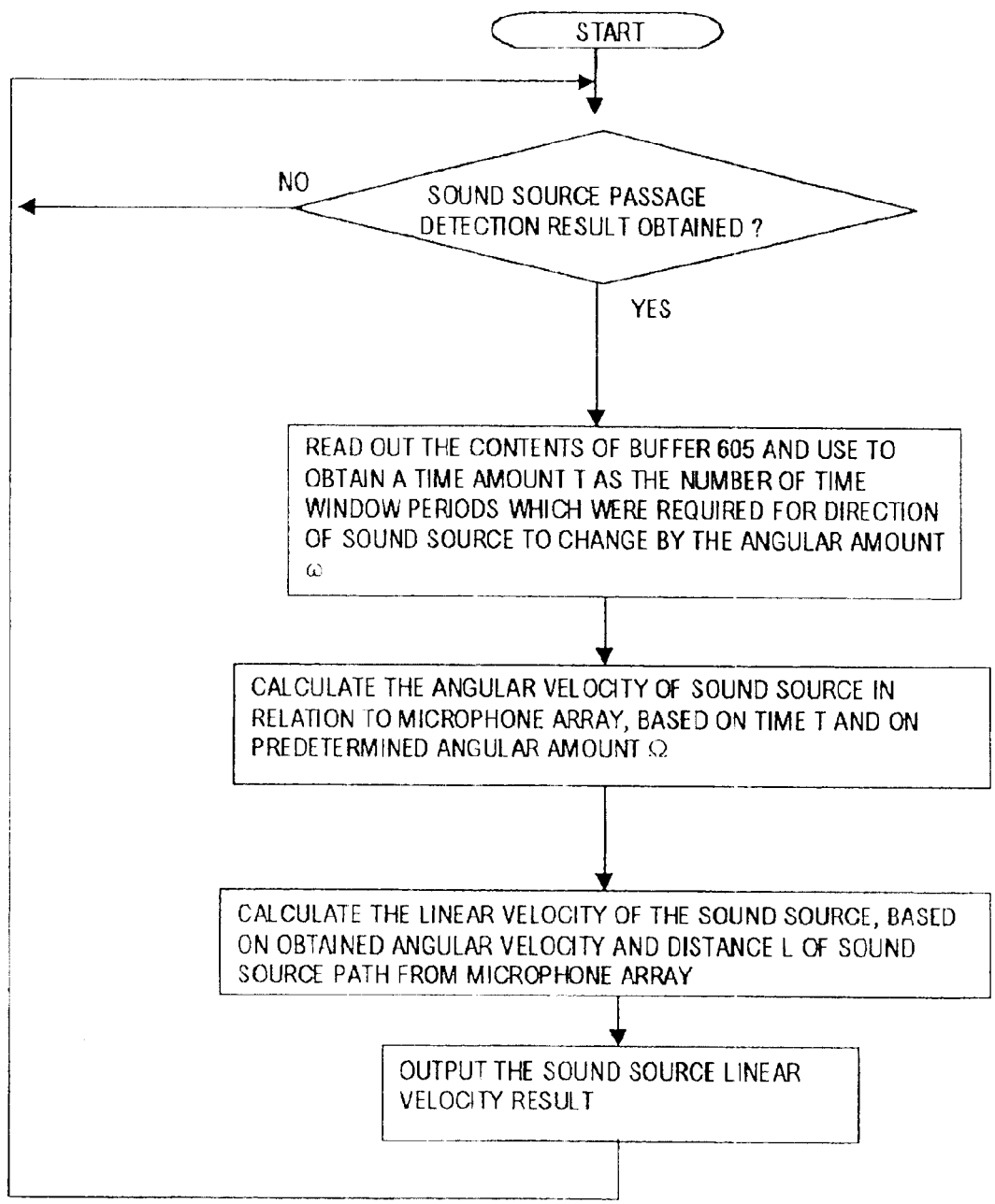
FIG. 14 is a flow diagram of a processing sequence executed by the sixth embodiment.

FIG. 14 illustrates the processing sequence executed with this embodiment, in the case of the form of operation described above.

Although the sixth embodiment has been described above for the case in which the angular velocity of a sound source is calculated by measuring the amount of time required for the sound source directions to move through a predetermined angular amount, it would be equally possible to predetermine a fixed time interval, and to use the contents of the buffer 605 to obtain the angular amount by which the sound source directions have changed within that predetermined time interval.

Furthermore, although the sixth embodiment has been described above for the case in which the angular velocity of a sound source is calculated on the basis of an amount of change in the sound source directions which occurred prior to the time point at which a passage detection result is generated, it would be equally possible to calculate the angular velocity of a sound source on the basis of an amount of change in the sound source directions which occurs subsequent to the time point at which a passage detection result is generated. That is to say, it would be possible for example to measure the amount of angular change in the successively obtained estimated directions which occurs during a fixed time interval following the time point at which a passage detection result is generated.

Thus with this embodiment, not only can the passage of a sound source be detected, but also the velocity at which the sound source is passing can also be derived, by using the passage detection result as a trigger for initiating velocity derivation processing.

Seventh Embodiment

A seventh embodiment will be described referring to the general system block diagram of FIG. 15 and the flow diagram of FIG. 16. The embodiment is formed of a microphone array 102, a sound source direction estimation section 116, a passage detection section 216, each of which operates as described hereinabove for correspondingly numbered sections of preceding embodiments, and a directivity control section 706. The directivity control section 706 is formed of a directivity controller 704, an adder 705, and an array of delay elements 703. The array of delay elements 703 respectively correspond to, and receive respective audio signals from, the microphones of the microphone array 102.

The directivity control section 706 operates on the output signals produced from the microphone array 102 and data provided from the sound source direction estimation section 116 and passage detection section 216 to obtain a monitoring signal which expresses the sound that is being emitted from a sound source as the sound source moves past the microphone array 102. Since the sound emitted from each of the sound sources will be monitored at a time when the sound sources are at substantially the same distance from the microphone array, such a monitoring signal can be used for example to estimate the respective levels of sound power which are produced by successive sound sources.

In the directivity control section 706, the direction controller 704 sets the respective delays of the delay elements 703 in response to a passage detection result being produced from passage detection section 216, in the following manner. When a sound source is detected as passing by the microphone array 102 (as indicated by generation of a passage detection result by the passage detection section 216) then designating the estimated direction obtained for the sound source at the time point when a passage detection result is generated as θs, the direction controller 704 calculates the vector d[m] (m=1, 2, ..., M) by using equation (10) below:

$$d[m] = \left[1, e^{-j\omega\tau}, e^{-j\omega 2\tau}, \ldots, e^{-j\omega(M-1)\tau}\right]^T \quad (10)$$

here, τ is defined by equation (11) below, in which c denotes the speed of sound:

$$\tau = (d \sin \theta s)/c \quad (11)$$

The elements of the vector d[m] are set as the respective delay values of the M delay elements 703. By setting the delay values in that way, the respective delayed audio signals produced from the delay elements are synchronized in phase with the sound source signal which arrives along the direction θs, i.e., by summing the outputs from the delay elements in the adder 705, a monitoring signal is obtained with directivity applied along the θs direction. Thus, the level of sound being emitted from the sound source which is currently at the direction θs can be selectively obtained, i.e., the sound produced from a specific moving sound source can be monitored.

Hence, the directivity control section 706 produces a monitoring signal that is obtained as a combination of the output signals from the microphone array 102, with an appropriate directivity applied.

Thus with the seventh embodiment, in addition to obtaining successive estimated directions of a sound source in relation to the microphone array 102, and judging when the sound source is currently passing by the microphone array 102, the level of sound emitted from that sound source can be monitored by appropriately orienting the effective directivity of the microphone array 102 in the direction of that sound source, with detection of passing of the sound source being used as a trigger for initiating this orienting of the directivity. With this embodiment therefore, using only a single array of microphones, it becomes possible to selectively monitor a sound emitted from a specific sound source which is at an arbitrary direction from the microphone array.

Various ways of utilizing the monitoring signal produced by this embodiment could be envisaged, for example setting successive pluralities of monitoring signal samples in a data buffer (not shown in the drawings), and reading out the current buffer contents after a fixed time interval has elapsed following a time point at which a passage detection result is generated. In that way, the condition of the monitoring signal while each specific sound source is passing the microphone array 102 can be obtained.

Figure 16:
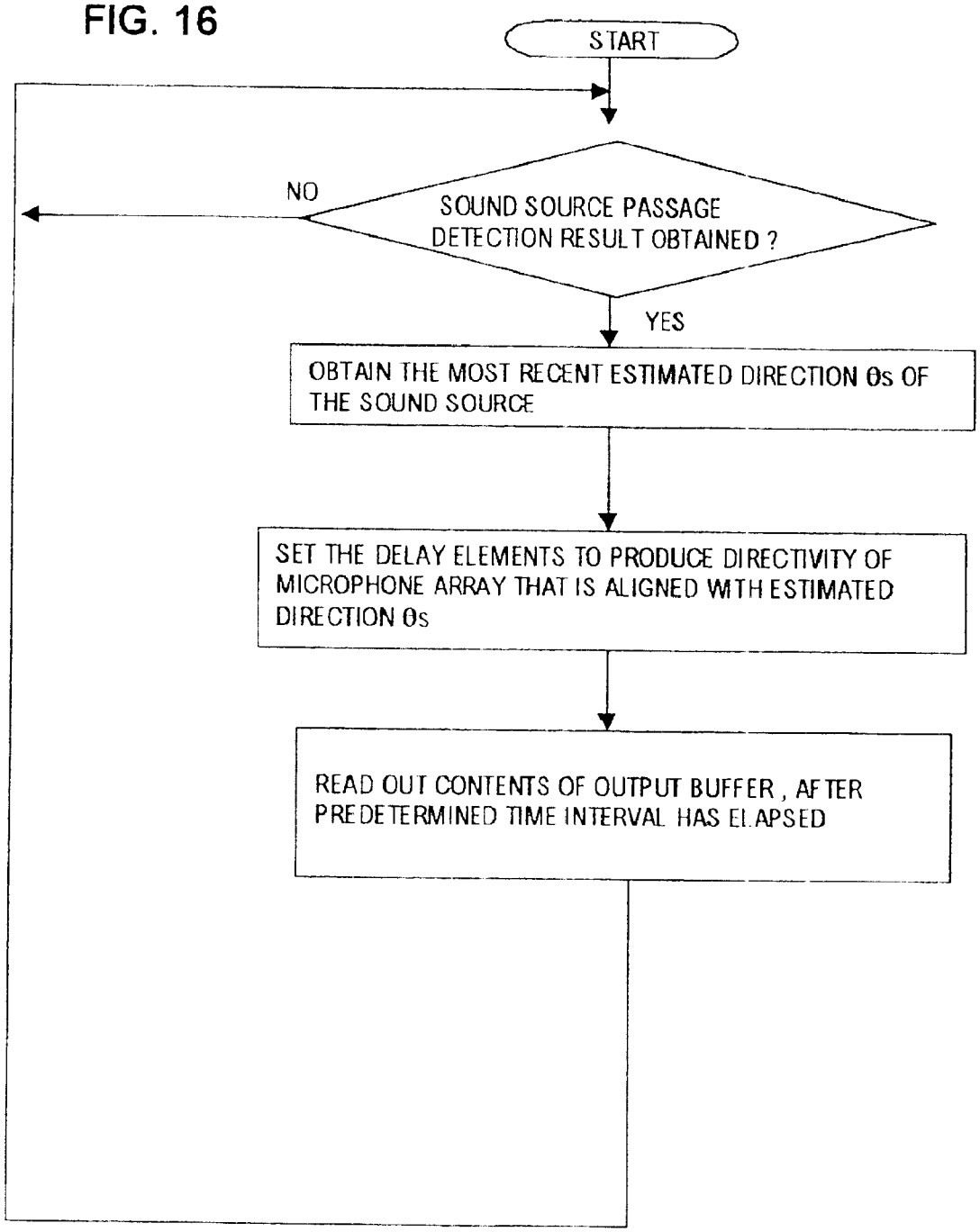
FIG. 16 is a flow diagram of a processing sequence executed by the seventh embodiment.

The processing sequence of this embodiment is illustrated in the flow diagram of FIG. 16, assuming the case in which such an output buffer is utilized.

Eighth Embodiment

With the preceding embodiment, it is necessary for the directivity controller 704 to establish a new set of delay values for the set of delay elements 703, each time that a passage detection result is obtained for a sound source from the passage detection section 216 together with an estimated direction produced from the sound source direction estimation section 116, in order to align the effective directivity of the microphone array 102 with the current estimated direction of the sound source. These estimated directions may vary substantially, depending upon the respective velocities of the sound sources, etc. For example, if a sound source is moving very slowly, then the aforementioned threshold number of in-range estimated directions $n_t$ may be reached at a point when the sound source has moved through only an initial small part of the passage detection range Pn. If on the other hand a sound source is moving very rapidly, so that its direction with respect to the microphone array changes by a large angular amount in each time window, then the sound source may have almost reached the final direction θf of the passage detection range Pn at the point when the threshold number of in-range estimated directions $n_t$ has been reached for that sound source.

Figure 17:
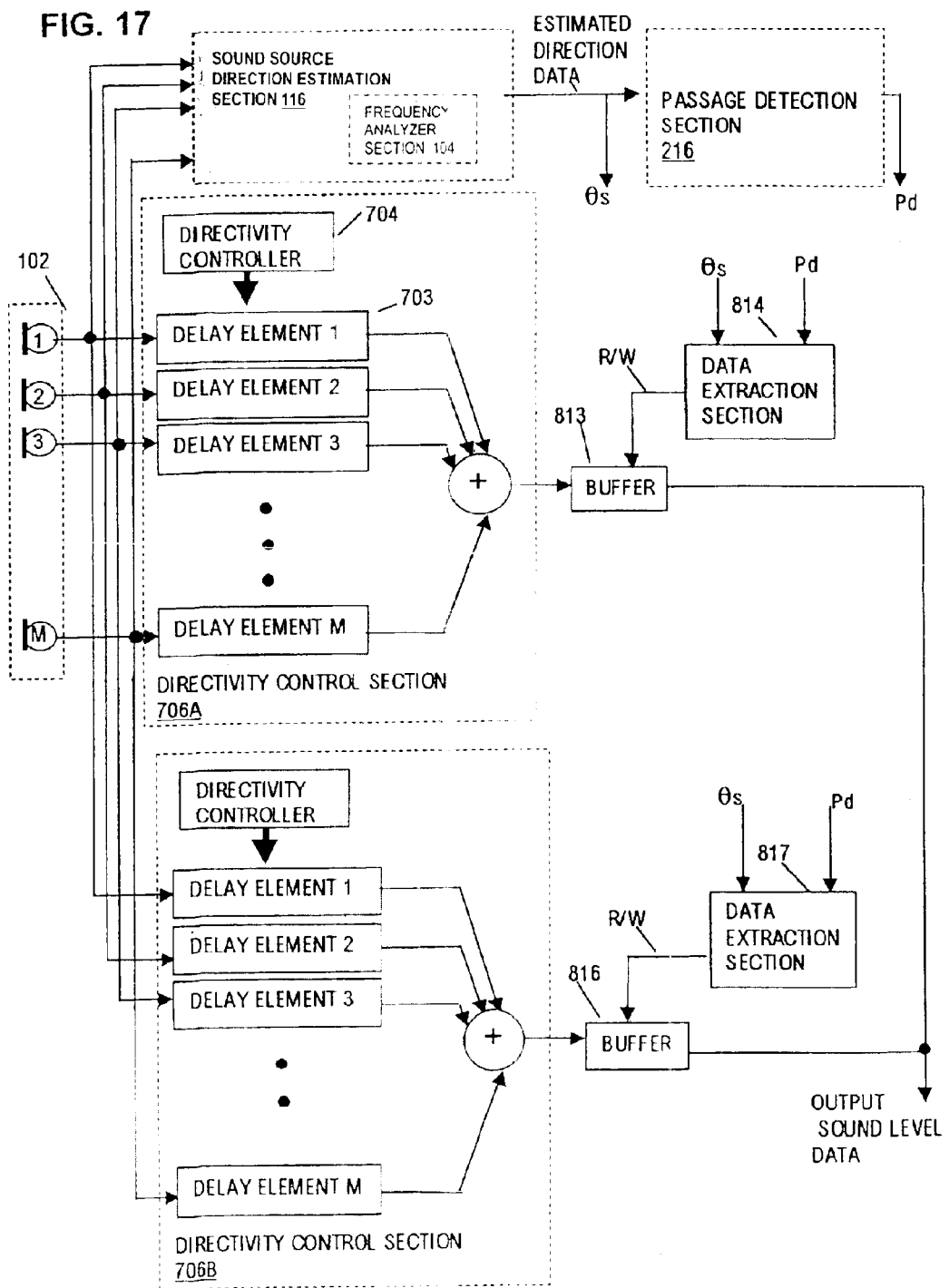
FIG. 17 is a general system block diagram of an eighth embodiment, which includes a directivity control section for operating on passage detection result and estimated directions to select one of a plurality of predetermined directivities of a microphone array for monitoring the sound emitted from a passing sound source.

In the case of sound sources which are moving with high velocity and are separated from one another by relatively small distances, e.g., vehicles travelling on an expressway, it may be impossible (due to limitations of system performance) to synchronize the operation of establishing an updated set of delay values for the delay elements 703 with the time point at which a new passage detection result is generated. An eighth embodiment will be described in the following, which is designed to overcome this problem. FIG. 17 shows the general configuration of this embodiment. This has basic similarities to the preceding embodiment, being formed of a sound source direction estimation section 116, a passage detection section 216, two data extractor sections 814, 817 and corresponding data buffers 813, 816, which receive data values produced from a directivity control section 706A and a directivity control section 706B respectively. With this embodiment, the output signals from the microphone array 102 are supplied not only to the sound source direction estimation section 116 and the directivity control section 706A but also to the directivity control section 706B.

Figure 15:
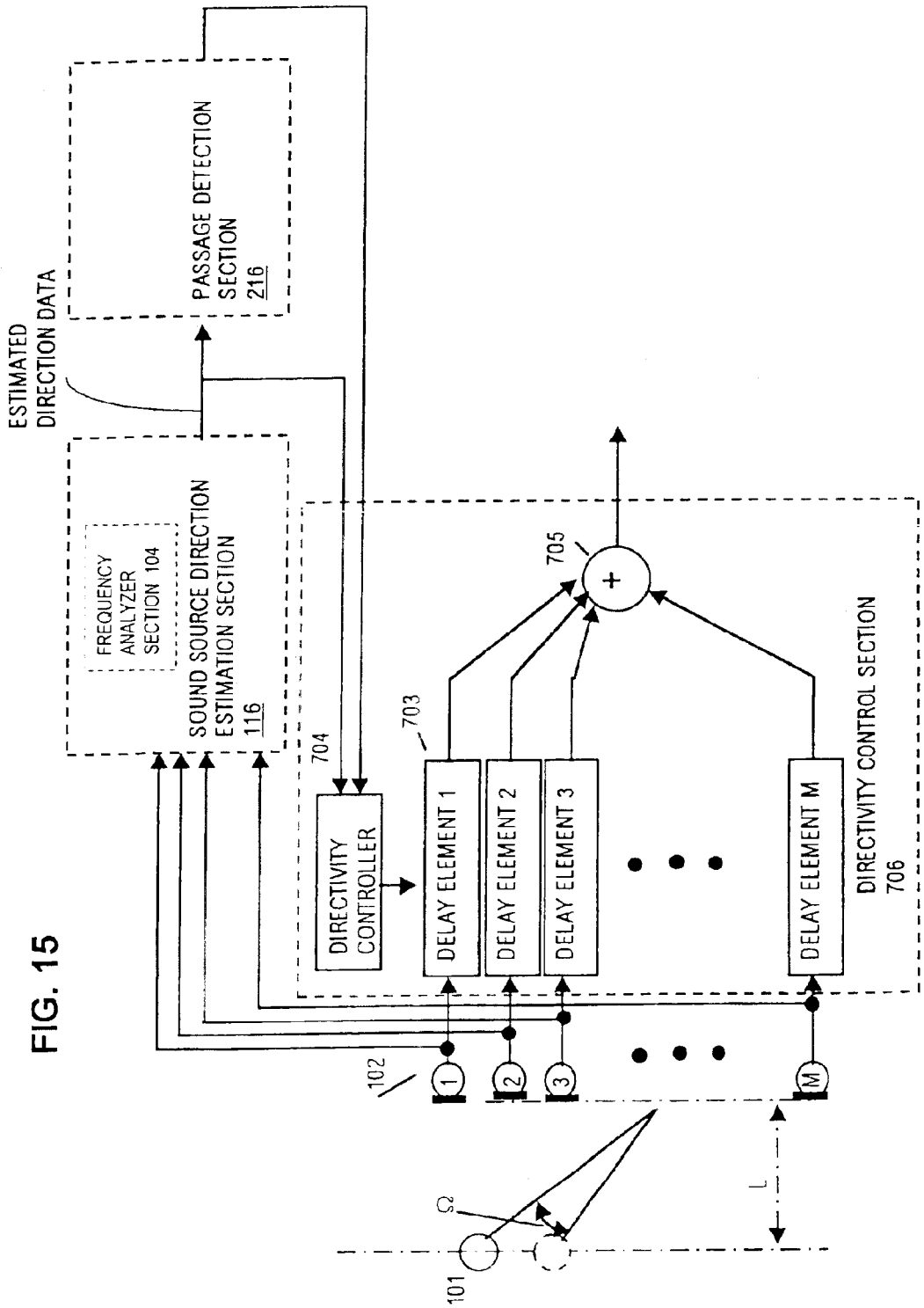
FIG. 15 is a general system block diagram of a seventh embodiment, which includes a directivity control section for operating on passage detection results obtained by a passage detection section and estimated directions obtained by a sound source direction estimation section, for setting the directivity of a microphone array such as to monitor a passing sound source.

Each of the directivity control sections 706A, 706B performs a similar function to that of the directivity control section 706 of the preceding embodiment shown in FIG. 15. However in each of the directivity control sections 706A, 706B, the respective delay values assigned to the set of delay elements are fixedly predetermined, such as to provide directivity along a direction θ1 in the case of the directivity control section 706A and along a direction θ2 in the case of the directivity control section 706B. Taking the directivity control section 706A for example, each time a new digital data sample expressing the sound level received along the direction θ1 is generated by the directivity control section 706A (i.e., as part of a monitoring signal produced by the directivity control section 706A as a combination of the output signals from the delay elements 703 with a specific directivity applied) it is written into the buffer 813 under the control of the data extraction section 814.

The directivity control section 706B, buffer 816 and data extraction section 817 operate in the same manner, with respect to the direction θ2.

Figure 19:
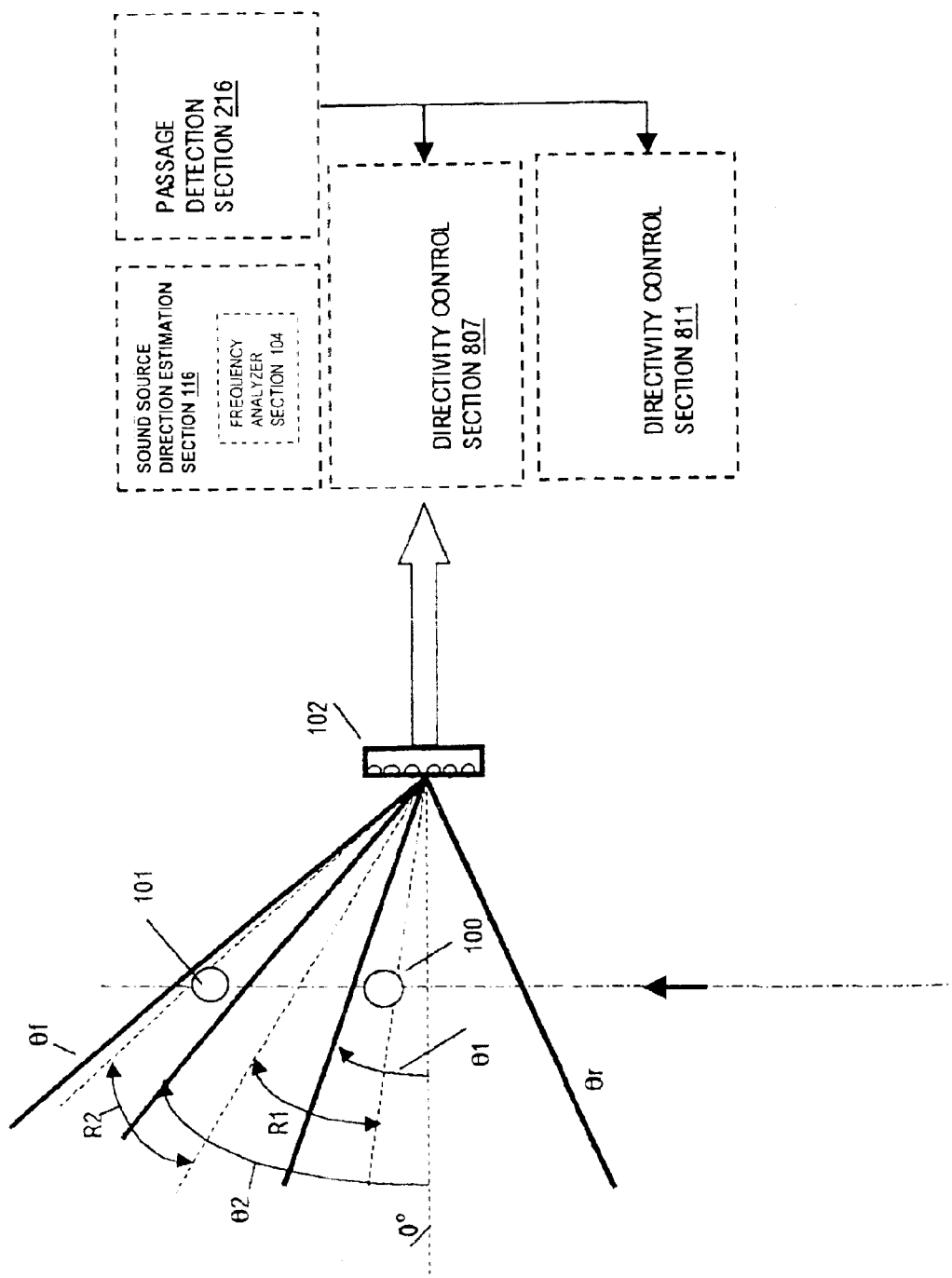
FIG. 19 is a conceptual diagram for use in describing the operation of the embodiment of the eighth embodiment.

The basic principles of the embodiment can be understood by referring to the conceptual diagram of FIG. 19. As shown, a first predetermined range of directions R1 is defined in relation to the microphone array 102, which is centered on the direction θ1, while a second range of directions R2 is centered on the direction θ2. The aforementioned predetermined range of directions Pn which is used by the passage detection section 216 to judge whether passage detection has occurred (i.e., as described hereinabove, whereby a count is performed of the number of times that estimated directions within that range are obtained for a sound source, and passage detection is judged to have occurred if the number counted within N successive time window periods is above the threshold number $n_t$) extends from an initial direction θr to a final direction θf. In FIG. 19, the threshold number of in-range estimated directions $n_t$ might be reached for the sound source 100 when it has reached the position shown, within the range R1. The data extraction section 814 accordingly reads out from the data buffer 813 the sound level data currently held in that buffer, i.e., data expressing variations in received sound level as obtained from directivity along the direction θ1. Similarly, The threshold number $n_t$ might be reached for the sound source 101 when it has reached the position shown, within the range R2. The data extraction section 817 accordingly reads out from the data buffer 816 the data currently held in that buffer, i.e., data expressing variations in received sound level as obtained from directivity along the direction θ2.

Read-out from the buffers 814, 817 are performed under the control of the data extraction sections 814, 817 at appropriate timings, e.g., in accordance with the requirements of an external apparatus which receives the sound level data.

It can thus be understood that with this embodiment, the disadvantage of the preceding embodiment is overcome, since the delay values of the sets of delay elements in the directivity control sections are fixedly predetermined, so that updating of the delay values of the delay elements 703 is not performed. However for each sound source, a monitoring data expressing variations in received sound level corresponding to that sound source will be obtained based on a microphone array directivity which is at least close to the direction of the sound source at the time of monitoring the received sound level. Hence monitored sound level values which are approximately correct can be obtained even for the case in which some of the sound sources may be moving at high velocity.

It will be further understood that although with this embodiment only two directivity control sections are utilized, it would be possible to achieve higher accuracy of sound level measurement, or increase the range of sound source velocities for which measurement can be performed, by increasing the number of directivity control sections, to thereby increase the number of ranges of angular directions such as R1 and R2 in FIG. 19.

Figure 18:
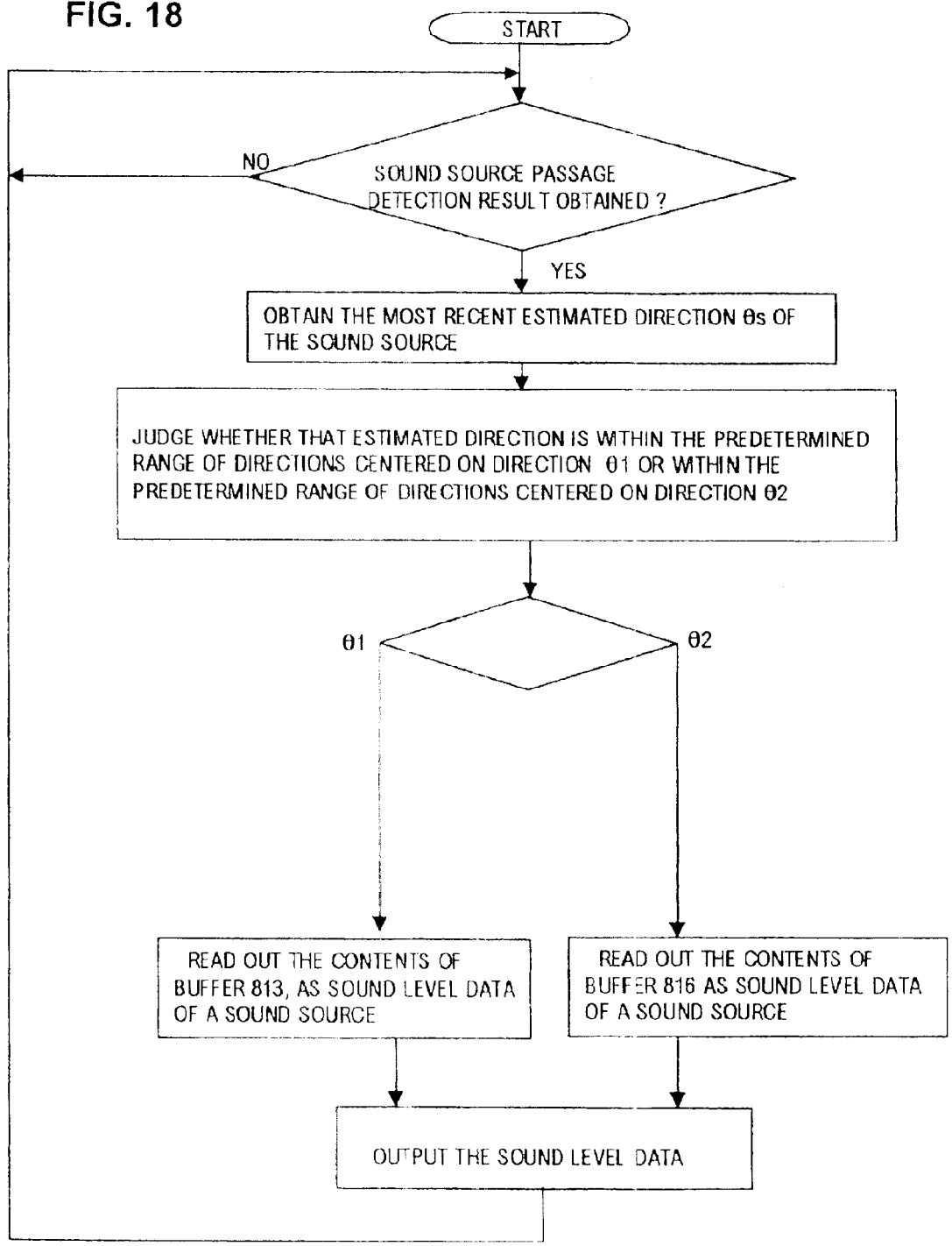
FIG. 18 is a flow diagram of a processing sequence executed by the eighth embodiment.

FIG. 18 is a flow diagram illustrating the basic principles of operation of this embodiment.

With the eighth embodiment, if for example two of the sound sources are travelling at a substantially identical high velocity and are separated by only a small distance, then the respective passage detection results for each of these sound sources would be successively produced from the passage detection section 216 within a very short time interval. Thus, the minimum amount of time which must elapse before data are read out from a buffer 813 or 816 after being written therein (in response to a passage detection result) is determined by the maximum velocity which will be attained by sound sources and by the minimum distance between successive sound sources. Designating the separation between the two sound sources (expressed as a distance along the line of travel) as S and their common velocity as V, it is necessary to perform data read-out from such a buffer (after data write-in as a result of detection of passage of the first of these sound sources) within a time interval that is shorter than approximately S/V, in order to ensure that the sound level data for the first sound source will not be lost due to write-in of sound level data for the second sound source.

Figure 20:
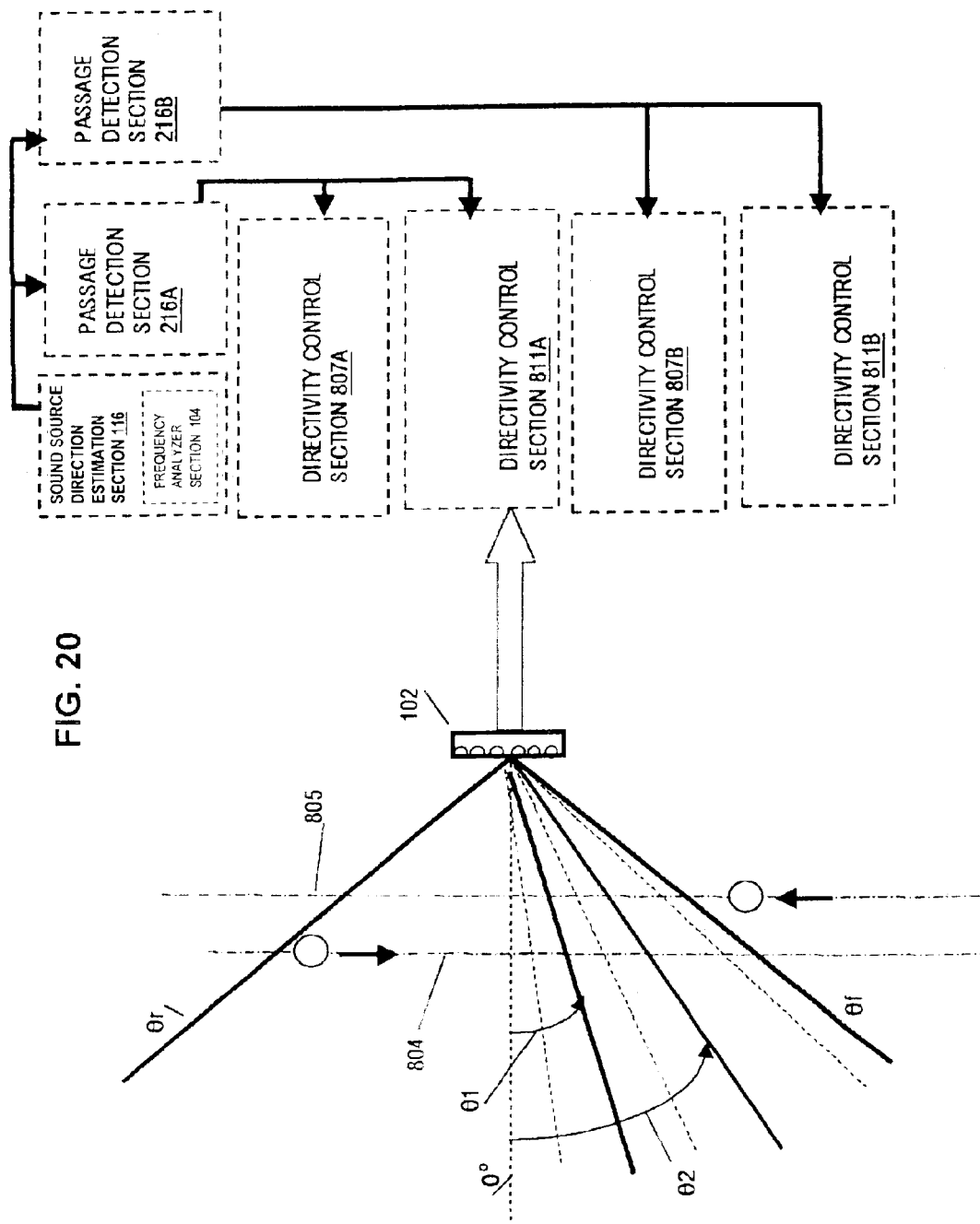
FIG. 20 is a conceptual diagram for use in describing a modified configuration of the eighth embodiment, for monitoring sound levels of sound sources moving along two adjacent paths with opposite directions of motion.
Figure 22:
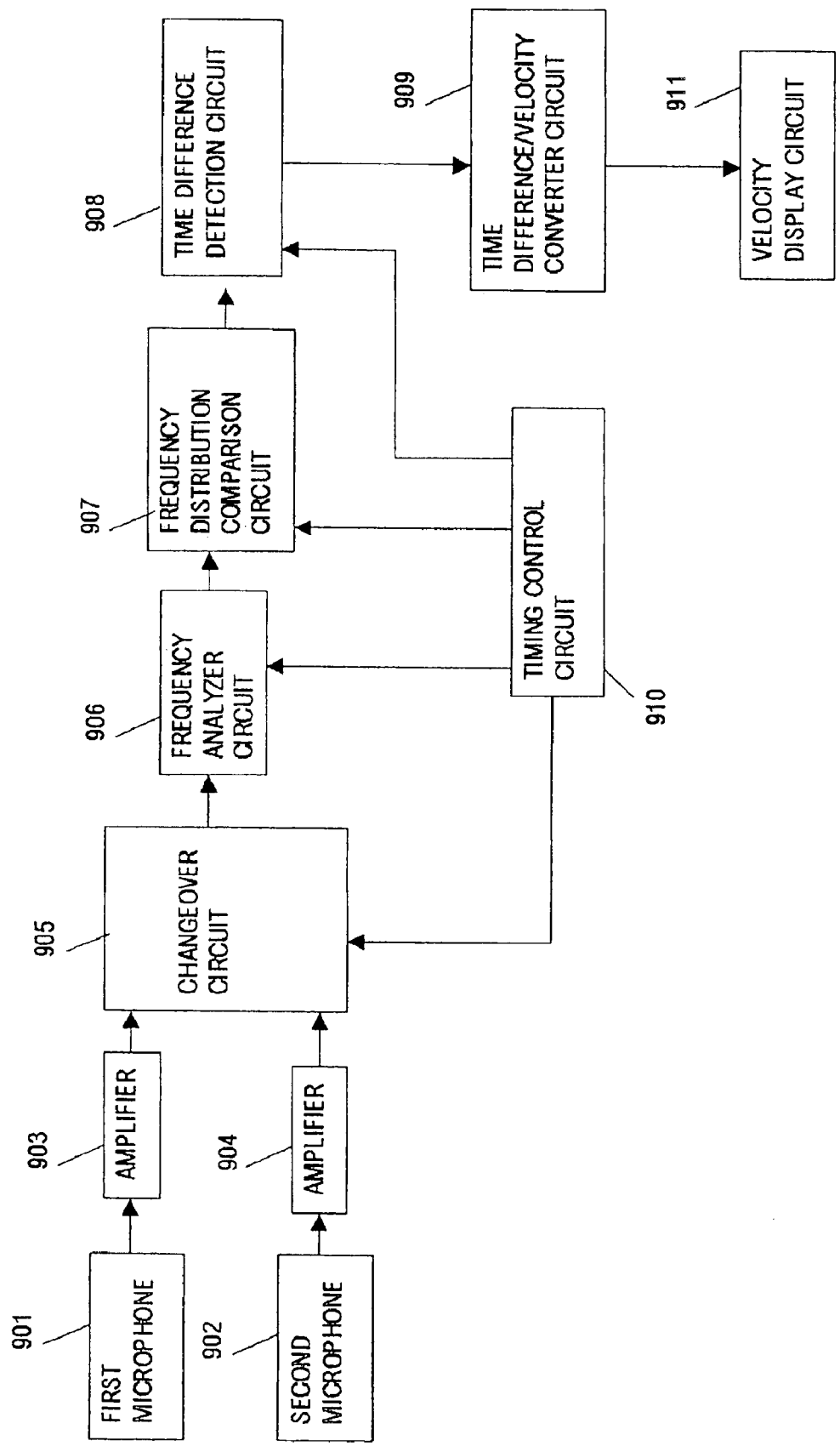
FIG. 22 is a general system block diagram of a prior art type of apparatus utilizing microphones to detect the directions of moving sound sources.

FIG. 20 is a conceptual diagram for illustrating how two passage detection sections 216A, 216B, each configured in a similar manner to the passage detection section 216, could be used to derive passage detection data for sound sources travelling in opposing directions, such as motor vehicle traffic on a two-way street, and supply respective passage detection results to two sets of directivity control sections 807A, 811A and 807B, 811B. In FIG. 22, the microphone array 102 is disposed adjacent to such a two-way street, in which traffic flows along a first path 805, which will be referred to as the upstream path, and a second path 804 which will be referred to as the downstream path. The microphone output signals from the microphone array 102 are supplied to the sound source direction estimation section 116 and to the directivity control sections 807A, 811A as in the embodiment of FIG. 17, and also to the second pair of directivity control sections 807B, 811B. The estimated directions obtained by the sound source direction estimation section 116 are supplied to each of the passage detection sections 216A and 216B.

The passage detection results from the passage detection section 216A (which detects only motion through a passage detection range along the upstream path 805) and each estimated direction corresponding to such a passage detection result, are supplied to the directivity control sections 807A, 811A, which function in a similar manner to the directivity control sections 807, 811 in FIG. 17. The passage detection results from the passage detection section 216B (which detects only motion through the passage detection range from θr to θf shown in FIG. 20 along the downstream path 804) and each estimated direction corresponding to such a passage detection result, are supplied to the directivity control sections 807B, 811B. The range of directions used by the directivity control sections 807A, 811A for passage detection in the upstream path 805 (omitted from FIG. 22) can be as shown in FIG. 19, i.e., extending from θr to θf in that diagram.

In that way, a single microphone array 102 and single sound source direction estimation section 116 can be used in implementing sound source passage detection and microphone array directivity control for both of the motion paths 804, 805.

Figure 21:
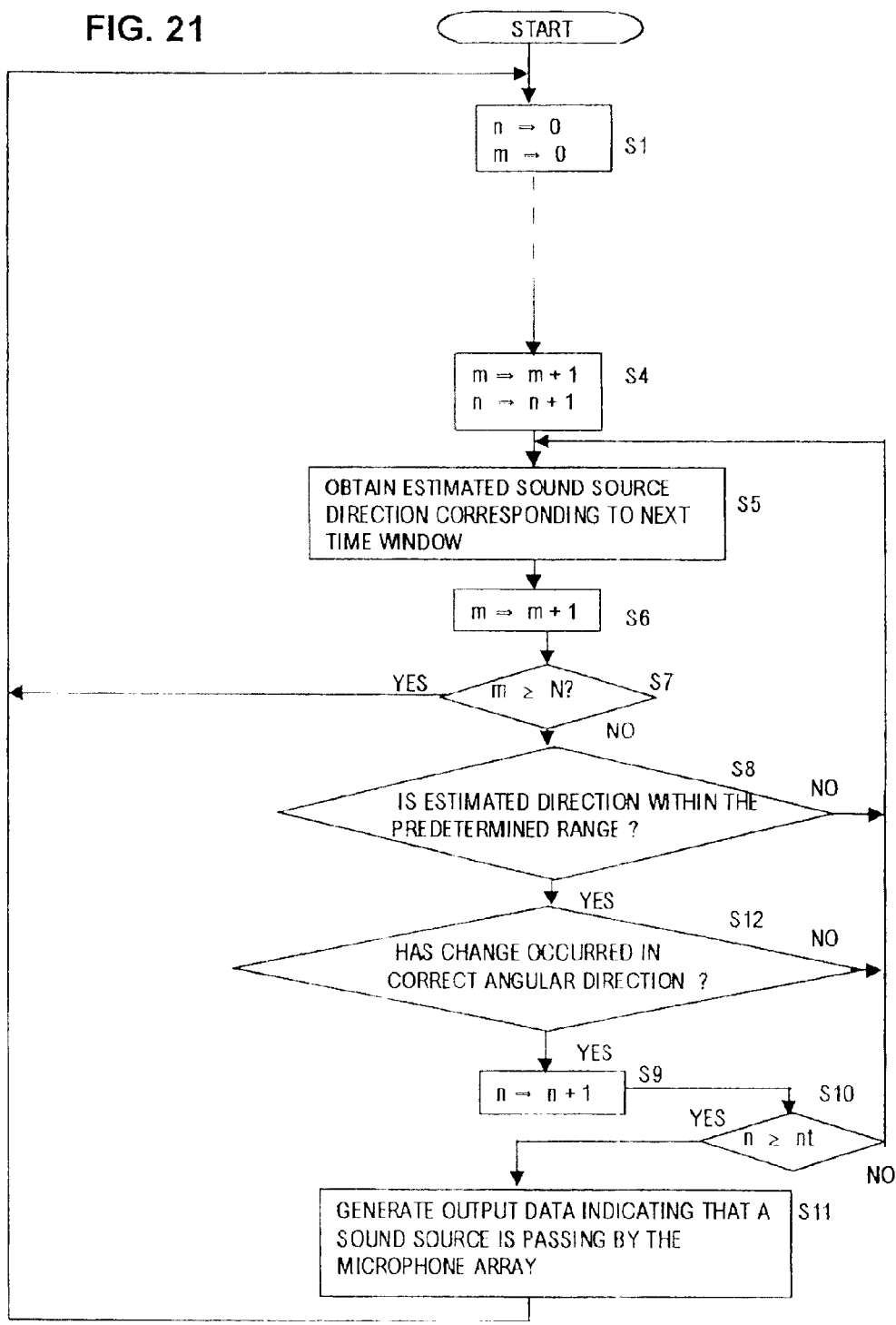
FIG. 21 is a partial flow diagram corresponding to FIG. 20.

FIG. 21 is a partial flow diagram (in which omitted steps S2, S3 are identical to those of the flow diagram of FIG. 7) for illustrating the processing sequence executed by each of the passage detection sections 216A, 216B. It will be understood that the condition step S8, in this case, must actually determine whether the current estimated direction (or one of these directions, if a plurality are generated for one time window by the passage detection section 216):

(a) is greater than (i.e., further advanced towards the final direction θf) or equal to the estimated direction obtained for the preceding time window, and (b) is within the passage detection range Pn, and (c) differs from the estimated direction obtained for the preceding time window by no more than a predetermined maximum amount.

Conditions (a) and (c) above serve to ensure that estimated directions obtained for any sound source travelling in the opposite direction to the desired sound source will be ignored. The maximum amount which is specified in that condition (c) will depend upon the minimum amount of distance anticipated between successive sound sources, and the range of velocities anticipated for the sound sources Although the present invention has been described in the above referring to specific embodiments, it is to be understood that various modifications to these embodiments or alternative forms of implementing the embodiments could be envisaged, which fall within the scope claimed for the invention in the appended claims.

What is claimed is:

1. A method of estimating a direction of a sound source, as an angular value in relation to a fixed position, comprising steps of:

in a fixed-length time window, operating on respective microphone output signals resulting from reception of sound emitted from said sound source during said time window, said microphone output signals produced from an array of M microphones, where M is a plural integer, to thereby extract from each of said microphone output signals a time-axis signal portion and thereby obtain a set of M audio signal portions with said set corresponding to said time window;

applying frequency analysis to separate each said signal portion into a plurality of components corresponding to respectively different ones of a fixed set of frequencies;

for each frequency of said fixed set, processing said components to obtain data expressing a frequency-based direction of a sound source with respect to a position in said microphone array, and calculating an average of respective frequency-based directions obtained for all frequencies of said fixed set, to thereby obtain an estimated direction corresponding to one time window; and successively repeating said succession of steps for each of a plurality of time windows that are of respectively identical time duration, to obtain a plurality of estimated directions respectively corresponding to said plurality of time windows.

2. The method according to claim 1, further comprising a step of:

for each of said time windows, calculating an average direction as an average of an estimated direction corresponding to said each time window and respective estimated directions corresponding to a fixed plurality of time windows which directly precede said each time window, and outputting said average direction as a finally obtained estimated direction corresponding to said each time window.

3. The method according to claim 1, wherein said processing applied for each frequency of said set of frequencies comprises deriving a plurality of values of received signal power with said values corresponding to respectively different directions in relation to said position in the microphone array, and finding a one of said directions for which said received signal power has a maximum value, and wherein said method further comprises a step of:

judging said direction for which said signal power has a maximum value, to determine whether said direction is within a predetermined range, and when said direction is found to be outside said range, excluding said direction from calculations performed to obtain said estimated direction of said sound source.

4. The method according to claim 1, further comprising a step of:

judging when a sound source has passed through a specific direction, by comparing said successive estimated directions obtained for said sound source with a predetermined passage detection range of directions, and generating data expressing a passage detection result when said sound source is found to have passed through said specific direction.

5. The method according to claim 4, wherein said judgement step is based upon:

detecting a number of times for which estimated directions obtained for said sound source are within said passage detection range of directions; and, determining that said sound source has passed through at least an initial direction of said passage detection range of directions when it is found that said number of times attains a predetermined threshold number within a fixed time interval which commences after said sound source has entered said passage detection range of directions.

6. The method according to claim 5, wherein said judgement step is performed by successive steps of:

detecting an initial time window as a time window at which an estimated direction obtained for said sound source is within a predetermined initial part of said passage detection range of directions;

thereafter, while obtaining successive count values of said time windows, obtaining successive count values of occurrences of said estimated directions obtained for said sound source being within said passage detection range of directions and comparing each said occurrence count value with said threshold number;

when said occurrence count values are found to attain said threshold number before said time window count values attain a predetermined maximum count value, generating output data as a passage detection result, to indicate that said sound source has passed through at least said initial part of said passage detection range of directions.

7. The method according to claim 4, further comprising a step of initiating recording of a microphone output signal from at least one of said microphones when a sound source is detected as having passed through said specific directions as indicated by generation of a passage detection result.

8. The method according to claim 7, wherein a time-axis portion of said microphone output signal which commenced prior to the time at which said sound source passed through said specific direction is recorded.

9. The method according to claim 8, comprising steps of:
temporarily storing each of successively obtained sets of audio data derived from an audio output signal of at least one of said microphones; and,
when a passage detection result is generated, reading out a currently stored one of said sets of audio data and recording said set of audio data.

10. The method according to claim 4, further comprising steps of:
judging when a sound source has passed through a specific direction, by comparing said successive estimated directions obtained for said sound source with a predetermined passage detection range of directions, and generating data expressing a passage detection result when said sound source is found to have passed through said specific direction; and
when said passage detection result is generated, judging a direction of motion of said sound source, based upon successively obtained estimated directions obtained for said sound source.

11. The method according to claim 10, wherein said judgement of direction is performed based upon a difference between an estimated direction obtained prior to a time of generating said passage detection result and an estimated direction estimated direction obtained at or subsequent to said time of generating the passage detection result.

12. The method according to claim 11, wherein said step of judging direction comprises:
temporarily registering each of successively obtained sets of said estimated directions in a buffer;
when a passage detection result is generated, reading out from said buffer a first estimated direction which was obtained at a point in time preceding a time of generating said passage detection result;
calculating the sign of the difference between said first estimated direction and an estimated direction obtained subsequent to said first estimated direction, with said direction of motion being indicated by said sign.

13. The method according to claim 10, wherein said judgement of direction is performed based upon a difference between an estimated direction obtained at a time of generating said passage detection result and an estimated direction obtained subsequent to said time of generating the passage detection result.

14. The method according to claim 13, wherein said step of judging direction comprises:
when a passage detection result is generated, temporarily registering a first estimated direction, which is obtained at that time; and,
after a predetermined number of said time windows have elapsed following generation of said passage detection result, calculating the sign of a difference between said first estimated direction and a currently obtained one of said estimated directions, with said direction of motion being indicated by said sign.

15. The method according to claim 1, further comprising a step of judging whether a sound source is stationary, based upon successively obtained ones of said estimated directions of said sound source.

16. The method according to claim 15, wherein said step of judging whether a sound source is stationary comprises calculating the variance of said successively obtained estimated directions of said sound source within each of respective fixed observation intervals, and judging that the sound source is stationary if said variance is found to be lower than a predetermined threshold value.

17. The method according to claim 16, further comprising:
calculating an average of said estimated directions within each of said observation intervals; and judging that the sound source is stationary if said variance is found to be lower than a predetermined threshold value and also said average direction is within a predetermined range of directions.

18. The method according to claim 1 wherein said microphone array is disposed at a known distance from a motion path of said sound source, further comprising steps of:
judging when a sound source has passed through a specific direction, by comparing said successive estimated directions obtained for said sound source with a predetermined passage detection range of directions, and generating data expressing a passage detection result when said sound source is found to have passed through said specific direction;
when said passage detection result is generated, judging the linear velocity of said sound source based upon successively obtained estimated directions obtained for said sound source.

19. The method according to claim 18, wherein said step of judgement of linear velocity comprises:
measuring an amount of time required for successive estimated directions obtained for said sound source to change by a predetermined angular amount;
calculating the angular velocity of said sound source based on said amount of time and said predetermined angular amount; and
calculating an approximate value of linear velocity of said sound source based on said angular velocity and said known distance of said microphone array from said motion path.

20. The method according to claim 19, wherein said amount of time is measured from a time point preceding the generation of said passage detection result up to the time point at which said passage detection result is generated.

21. The method according to claim 19, wherein said amount of time is measured from the time point at which said passage detection result is generated up to a subsequent time point.

22. The method according to claim 19, wherein said amount of time is measured from a time point preceding the generation of said passage detection result up to a time point subsequent to the time point at which said passage detection result is generated.

23. The method according to claim 18, wherein said step of judgement of linear velocity comprises:
   measuring an amount of change of successive estimated directions obtained for said sound source, expressed as an angular amount, which occurs within a predetermined time interval;
   calculating the angular velocity of said sound source based on the duration of said predetermined time interval and said angular amount; and
   calculating an approximate value of linear velocity of said sound source based on said angular velocity and said known distance of said microphone array from said motion path.

24. The method according to claim 23, wherein said amount of change of estimated directions is measured from an estimated direction obtained prior to the time point at which said passage detection result is generated up to an estimated direction obtained at the time point at which said passage detection result is generated.

25. The method according to claim 23, wherein said amount of change of estimated directions is measured from an estimated direction obtained at the time point when said passage detection result is generated up to an estimated direction obtained at a time point subsequent to that at which said passage detection result is generated.

26. The method according to claim 23, wherein said amount of change of estimated directions is measured from an estimated direction obtained prior to the time point at which said passage detection result is generated up to an estimated direction obtained subsequent to the time point at which said passage detection result is generated.

27. The method according to claim 1, further comprising a step of utilizing said estimated directions obtained for a sound source to orient a directivity of said microphone array along a current direction of said sound source.

28. The method according to claim 27, wherein a single directivity of said microphone array is oriented along said current direction of said sound source by applying specific degrees of phase shift processing to respective output signals produced from said microphones and summing resultant phase-shifted signals.

29. The method according to claim 27, comprising steps of:
   judging when a sound source has passed through a specific direction, based on said successive estimated directions obtained for said sound source, and generating data expressing a passage detection result when said sound source is found to have passed through said specific direction;
   orienting said microphone array directivity along a specific one of said estimated directions, said specific estimated direction being obtained at a time point substantially close to a time point at which said passage detection result is generated; and
   obtaining a monitoring signal expressing a sound being emitted from said sound source, as a combination of said microphone output signals with said directivity applied.

30. The method according to claim 1, further comprising steps of:
   establishing a plurality of fixedly predetermined directivities for said microphone array;
   judging when a sound source has passed through a specific direction, based on said successive estimated directions obtained for said sound source, and generating data expressing a passage detection result when said sound source is found to have passed through said specific direction;
   when said passage detection result is obtained for said sound source, selecting one of said plurality of directivities based upon an estimated direction obtained for said sound source at a time point substantially close to a time point at which said passage detection result is generated; and,
   obtaining a monitoring signal expressing a sound being emitted from said sound source, as a combination of said microphone output signals with said selected one of the directivities applied.

31. An apparatus for estimating a direction of a sound source, comprising:
   waveform extraction means (103) for operating during a fixed-length time window on respective microphone output signals produced from an array of M microphones, where M is a plural integer, to extract from each of said microphone output signals a time-axis signal portion within said time window, and thereby obtain a set of M audio signal portions corresponding to said time window;
   frequency analyzer means (104) for applying frequency analysis to said set of M audio signal portions to separate each said signal portion into a plurality of components corresponding to respectively different ones of a fixed set of frequencies; and
   processing means (107, 108, 109, 110, 106) for operating on said components corresponding to said set of M audio signal portions to obtain, for each frequency of said fixed set of frequencies, data expressing an estimated direction of said sound source with respect to a position in said microphone array,
   to thereby obtain an estimated direction of said sound source corresponding to said time window;
   wherein said apparatus operates during successive plurality of time windows that are of respectively identical duration, to obtain a plurality of estimate directions of said sound source respectively corresponding to said plurality of time windows.

32. The apparatus according to claim 31, further comprising: frequency-based averaging means (114) for obtaining an average of respective estimated directions obtained for said fixed set of frequencies within each of said time windows, to thereby obtain successive frequency-average estimated directions of said sound source corresponding to respective ones of said time windows.

33. The apparatus according to claim 32, further comprising means for obtaining respective averages of fixed-length sets of said frequency-averaged estimated directions obtained in successive time windows, to thereby obtain successive time-averaged estimated directions of said sound source.

34. The apparatus according to claim 31, wherein said processing applied by said processing means for each frequency of said set of frequencies comprises deriving a plurality of values of received signal power with said values corresponding to respectively different directions in relation to said position in the microphone array, and finding a one of said directions for which said received signal power has a maximum value, and wherein said processing means further comprises out-of range value exclusion means (112, 111) for:
   judging said direction for which said signal power has a maximum value, to determine whether said direction is within a predetermined range, and when said direction is found to be outside said range, excluding said direction from calculations performed to obtain said estimated direction of said sound source.

35. The apparatus according to claim 31, further comprising passage detection means (216) including judgement means for operating on said successive estimated directions obtained for a sound source in relation to a predetermined passage detection range of directions, to generate data expressing a passage detection result when said sound source is found to have passed through a specific direction.

36. The apparatus according to claim 35, wherein said passage detection means comprises:
 direction range setting means (211) for specifying said passage detection range of directions;
 in-range occurrence number calculation means (212) for detecting a number of times for which estimated directions obtained for said sound source are within said passage detection range of directions; and,
 passage detection judgement means (213) for determining that said sound source has passed through at least an initial direction of said passage detection range of directions when said number of times attains a predetermined threshold number within a fixed time interval which commences after said sound source has entered said passage detection range of directions.

37. The apparatus according to claim 36, wherein said passage detection judgement means (213) comprises means for:
 detecting an initial time window as a time window at which an estimated direction obtained for said sound source is within a predetermined initial part of said passage detection range of directions;
 thereafter, while obtaining successive count values of said time windows, obtaining successive count values of occurrences of said estimated directions obtained for said sound source being within said passage detection range of directions and comparing each said occurrence count value with said threshold number;
 when said occurrence count values are found to attain said threshold number before said time window count values attain a predetermined maximum count value, generating output data as a passage detection result, to indicate that said sound source has passed through at least said initial direction of said passage detection range of directions.

38. The apparatus according to claim 35, further comprising means for initiating recording of a microphone output signal from at least one of said microphones when a sound source is detected as having passed through said specific direction, as indicated by generation of a passage detection result.

39. The apparatus according to claim 38, comprising:
 buffer means (307) for temporarily storing each of successively obtained sets of audio data derived from an output signal of at least one of said microphones;
 data extraction means (308) responsive to generation of a passage detection result for reading out a currently stored one of said sets of audio data; and,
 recording means (309) for recording said sets of audio data.

40. The apparatus according to claim 31, further comprising means for determining whether a sound source is stationary, based upon successively obtained ones of said estimated directions of said sound source.

41. The apparatus according to claim 40, wherein said means for determining whether a sound source is stationary comprises:

variance calculating means (406) for calculating the variance of respective sets of said successively obtained estimated directions within each of fixed observation intervals; and,
stationary sound source detection means (407) for judging said variances, and for determining that a sound source is stationary when a variance of estimated directions obtained for said sound source is found to be lower than a predetermined threshold value.

42. The apparatus according to claim 41, further comprising moving average calculation means (405) for calculating respective averages of said sets of estimated directions within each of said observation intervals;
 wherein said stationary sound source detection means (407) judges that said sound source is stationary when said variance is found to be lower than said predetermined threshold value and also said average of the estimated directions is within a predetermined range of directions.

43. The apparatus according to claim 31, further comprising:
 passage detection means (216) including judgement means for operating on said successive estimated directions obtained for a sound source in relation to a predetermined passage detection range of directions, to generate data expressing a passage detection result when said sound source is found to have passed through a specific direction; and,
 motion direction derivation means (509) responsive to generation of said passage detection result in relation to a sound source for determining a direction of motion of a sound source, based upon successively obtained estimated directions obtained for said sound source.

44. The apparatus according to claim 43, wherein said motion direction derivation means (509) comprises:
 buffer means (505) for temporarily registering each of successively obtained sets of said estimated directions;
 prior-to-passage direction derivation means (506) responsive to generation of said passage detection result in relation to a sound source for reading out from said buffer means a one of said estimated directions which had been registered in said buffer means at a point in time preceding a time point of generating said passage detection result, as a first estimated direction;
 subsequent-to-passage direction derivation means (507) responsive to said generation of a passage detection result in relation to said sound source for selecting a one of said estimated directions which is obtained at a time point identical to or subsequent to a time point at which said passage detection result is generated, as a second estimated direction; and
 motion direction detection means (508) for calculating the sign of a difference between said first estimated direction and second estimated direction, with said direction of motion being indicated by said sign of the difference.

45. The apparatus according to claim 31 wherein said microphone array is disposed at a known distance from a motion path of said sound source, further comprising:
 passage detection means (216) including judgement means for operating on said successive estimated directions obtained for a sound source in relation to a predetermined passage detection range of directions, to generate data expressing a passage detection result when said sound source is found to have passed through a specific direction; and
 velocity derivation means (609) responsive to generation of said passage detection result in relation to a sound source for estimating the linear velocity of said sound source, based upon successively obtained estimated directions obtained for said sound source.

46. The apparatus according to claim 45, wherein said velocity derivation means (609) comprises:

buffer means(605) for temporarily registering each of successively obtained sets of said estimated directions;

angular amount determining means (607) for specifying a predetermined angular amount;

motion interval calculation means (606) responsive to generation of said passage detection result in relation to a sound source for reading out a set of estimated directions currently held in said buffer means and calculating, based on said set of estimated directions, an amount of time required for said sound source to move through a range of directions equal to said predetermined angular amount, and velocity detection means (608) for calculating the angular velocity of said sound source based on said amount of time and said predetermined angular amount, and for calculating an approximate value of linear velocity of said sound source, based upon said angular velocity and said known distance of said microphone array from said motion path.

47. The apparatus according to claim 31, further comprising directivity control means (706) for orienting a directivity of said microphone array along an estimated direction obtained for said sound source to thereby derive, as a combination of said microphone output signals with said directivity applied, a monitoring signal expressing a sound being emitted from said sound source.

48. The apparatus according to claim 47, further comprising passage detection means (216) for detecting that a sound source has passed through a specific direction, based on said successive estimated directions obtained for said sound source, and generating data expressing a passage detection result when said sound source is found to have passed through said specific direction, and wherein said directivity control means (706) comprises:

directivity setting means (704, 703) responsive to generation of said passage detection result in relation to a sound source for orienting said microphone array directivity along a specific one of said estimated directions, said specific estimated direction being obtained at a time point substantially close to a time point at which said passage detection result is generated.

49. The apparatus according to claim 31, further comprising:

passage detection means (216) for detecting that a sound source has passed through a specific direction, based on said successive estimated directions obtained for said sound source, and generating data expressing a passage detection result when said sound source is found to have passed through said specific direction;

directivity control means (706A, 706B) for concurrently establishing a plurality of fixedly predetermined directivities for said microphone array; and selection control means (814, 817) responsive to generation of a passage detection result for selecting one of said plurality of directivities, with said selection based upon an estimated direction obtained at a time point substantially close to a time point at which said passage detection result is generated.

50. The apparatus according to claim 49, further comprising a plurality of data buffers (813, 816) respectively corresponding to said plurality of directivities, each such data buffer being adapted to store successive time-axis portions of a monitoring signal which is obtained with the directivity corresponding to said data buffer, wherein said selection control means (814, 817) responds to generation of a passage detection result by reading out the current contents of a data buffer corresponding to said selected one of the plurality of directivities.

* * * * *

UNITED STATES PATENT AND TRADEMARK OFFICE
CERTIFICATE OF CORRECTION

PATENT NO.     : 6,862,541 B2
DATED          : March 1, 2005
INVENTOR(S)    : Mizushima It is certified that error appears in the above-identified patent and that said Letters Patent is hereby corrected as shown below:

Column 21,
Line 46 and 47, the second occurrence of "estimated direction" should be removed.

Signed and Sealed this

Fifth Day of July, 2005

JON W. DUDAS
*Director of the United States Patent and Trademark Office*